United States Patent [19]

Killpatrick et al.

[11] Patent Number: 5,363,194
[45] Date of Patent: Nov. 8, 1994

[54] LASER GYRO MICROPROCESSOR START UP CONTROL METHOD AND APPARATUS

[75] Inventors: Joseph E. Killpatrick, Minneapolis; Keith R. Fritze, Minnetonka; Dale F. Berndt, Plymouth, all of Minn.

[73] Assignee: Honeywell Inc., Minneapolis, Minn.

[21] Appl. No.: 931,941

[22] Filed: Aug. 18, 1992

[51] Int. Cl.5 .................................. G01B 9/02
[52] U.S. Cl. ..................................... 356/350
[58] Field of Search ......................... 356/350

[56] References Cited

U.S. PATENT DOCUMENTS

| | | | |
|---|---|---|---|
| 4,267,478 | 5/1981 | Ljung et al. | 356/350 |
| 4,667,162 | 5/1987 | Broberg et al. | 356/350 |
| 4,755,057 | 7/1988 | Curby et al. | 356/350 |
| 5,225,889 | 7/1993 | Fritze et al. | |

OTHER PUBLICATIONS

IEEE Plans 1990 20 Mar. 1990, Las Vegas, USA pp. 528-536 XP163833 J. M. Oelschlaeger and L. O. Thielman 'GG1308 Ring Laser Gyro Inertial Measurement Systems-Honeywell's Low Cost Solution for Tactial Applications'.
IEEE Plans 1990 20 Mar. 1990, Las Vegas Use pp. 543-548 XP163835 G. L. Curran and J. Engelken 'Ring Laser Gyro Applications for Tactical Missiles-The Army TACMS Solution'.

*Primary Examiner*—Mark Hellner
*Attorney, Agent, or Firm*—Robert B. Leonard

[57] ABSTRACT

A laser gyro start up apparatus and method that safely and quickly starts a laser gyro. A microprocessor sequences the mechanical and electrical systems of the laser gyro such that the gyro is started up quickly in the proper sequence. The microprocessor also executes tests on the gyro and provides a health signal in the timing sequence. The start up apparatus starts the laser block dither, laser discharge and acquires the path length controllers. Optical start up operations may be performed including the calibration of volts per mode.

22 Claims, 23 Drawing Sheets

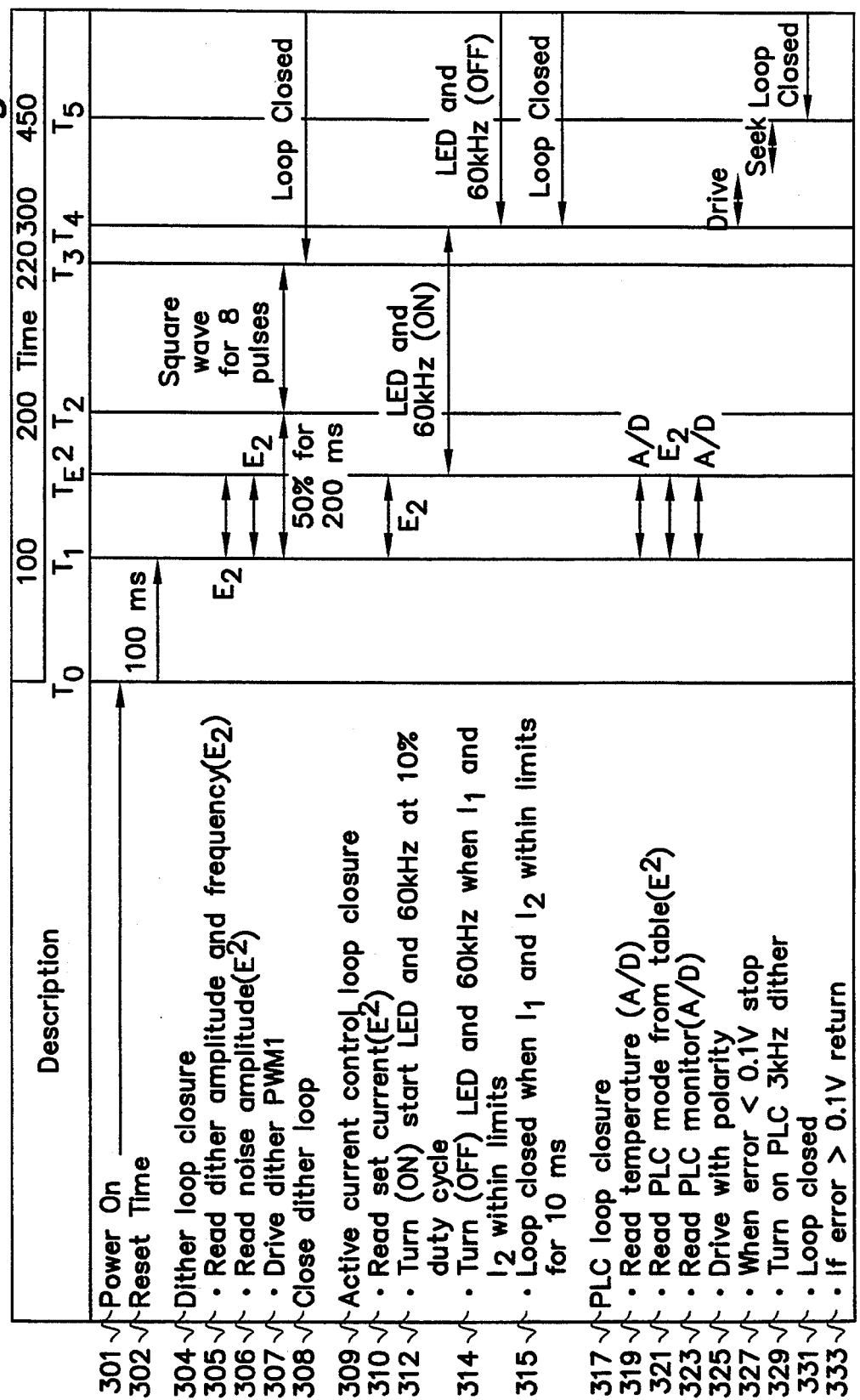

Fig. 3B

MODULAR GYRO START-UP TIMING DIAGRAM (CONTINUED)

| | Description | $T_0$ | $T_1$ | $T_E2$ | $T_2$ | $T_{EEROM}$ | $T_3$ | $T_4$ | $T_5$ | $T_{A/D}$ | $T_{OK}$ |
|---|---|---|---|---|---|---|---|---|---|---|---|
| 335 | BDI drive | | | | | | | | | | |
| 336 | Read the volts/mode ($E^2$) | | | $E^2$ | | | | | | | |
| 338 | Set PWM 0 at 50% (128/256) | | | | | | PWM 50% | | | | |
| 340 | Increment one count every 0.1s until ±λ is reached | | | | | | | | Increment | | |
| 341 | Dither stripper loop closure | | | | | | | | | | |
| 343 | Read previous dither stripper constant($E^2$) | | | | | $E^2$ | | | | | |
| 345 | Use high gain until rate of change is < 1%/s | | | | | | | | High Gain | | |
| 347 | Reduce gain | | | | | | | | Low Gain | | |
| 350 | Gyro status (BIT) | | | | | | | | | | |
| 351 | Read all $K_i$ constants ($E^2$) | | | | | EEPROM | | | | | |
| 353 | Read RIM A > minimum RIM (A/D) | | | | | | | | | A/D | |
| 355 | Read RIM B minimum RIM (A/D) | | | | | | | | | A/D | |
| 357 | Check PLC within 0.1v (A/D) | | | | | | | | | A/D | |
| 359 | Dither error < 50 arc/s | | | | | | | | | A/D | |
| 360 | Dither stripper constant unchanged < 0.1%/s | | | | | | | | | A/D | |
| 361 | $I_1$ and $I_2$ within limits | | | | | | | | | A/D | |
| 363 | LIM within limits | | | | | | | | | A/D | |
| 365 | Temperature −40°C to 125°C (A/D) | | | | | | | | | A/D | |
| 368 | Send I'm ok | | | | | | | | | | I'm ok |

| 0 | 1 | 2 | 3 | 4 | 5 | 6 |
|---|---|---|---|---|---|---|
| DITHER DRIVE OK | READ-OUT COUNTER OK | LASER DRIVE CURRENT OK, LEG1 | LASER DRIVE CURRENT OK, LEG2 | TEMP SENSOR HI LIMIT TEST OK | TEMP SENSOR LO LIMIT TEST OK | MISSING SAMPLE STB DETECTED |

BUILT-IN TEST EQUIPMENT (BITE) STATUKS REGISTER
CYCLIC BIT FUNCTIONS

LASER GYRO MICROPROCESSOR START UP CONTROL METHOD AND APPARATUS

This invention relates to a method of starting a ring laser gyro and more particularly to a method of starting a ring laser gyro controlled by a microcontroller.

BACKGROUND OF THE INVENTION

Ring laser angular rate sensors, also called laser gyros, are well known in the art. One example of a ring laser angular rate sensor is U.S. Pat. No. 4,751,718 issued to Hanse, et al., which is incorporated herein by reference thereto. Referring to FIG. 1A, ring laser angular rate sensors include a thermally and mechanically stable laser block 5 having a plurality of formed cavities for enclosing a gap. Mirrors 13, 15 are placed at the extremities of the cavities for reflecting laser beams 11, 16 and providing an optical closed-loop path.

The activation of the laser gyro's various subsystems at start up may have ramifications for the life of the laser mirrors and other system components. A method is needed to orchestrate the various subsystems at start up given each subsystem's start up constraints.

Therefore it is the motive of this invention to provide a laser gyro start up method that provides a synchronized and effective start up procedure that results in minimum delay and minimum adverse effects.

SUMMARY OF THE INVENTION

The invention provides a method of starting up a ring laser gyro. In the ring laser gyro a dither drive, laser discharge, active current control circuit, path length control circuit, BDI drive circuit, dither stripper circuit, and gyro built-in test all have to be initialized. The various functions of the laser gyro are started under the control of a microcontroller. The microcontroller assures a proper starting sequence with correct timing which assures a quick start of the gyro.

It is an object of the invention to provide a quick laser gyro start up.

It is a further object of the invention to provide a microcontrolled-based start up sequencer.

Other objects, features and advantages of the present invention will become apparent to those skilled in the art through the description of the preferred embodiment, claims and drawings herein where like numerals refer to like elements.

BRIEF DESCRIPTION OF THE DRAWINGS

FIGS. 3A and 3B show a laser gyro start up timing diagram showing start up timing sequences.

FIG. 12 shows schematically a built in test equipment status register.

DESCRIPTION OF THE PREFERRED EMBODIMENT

Figure 1A:
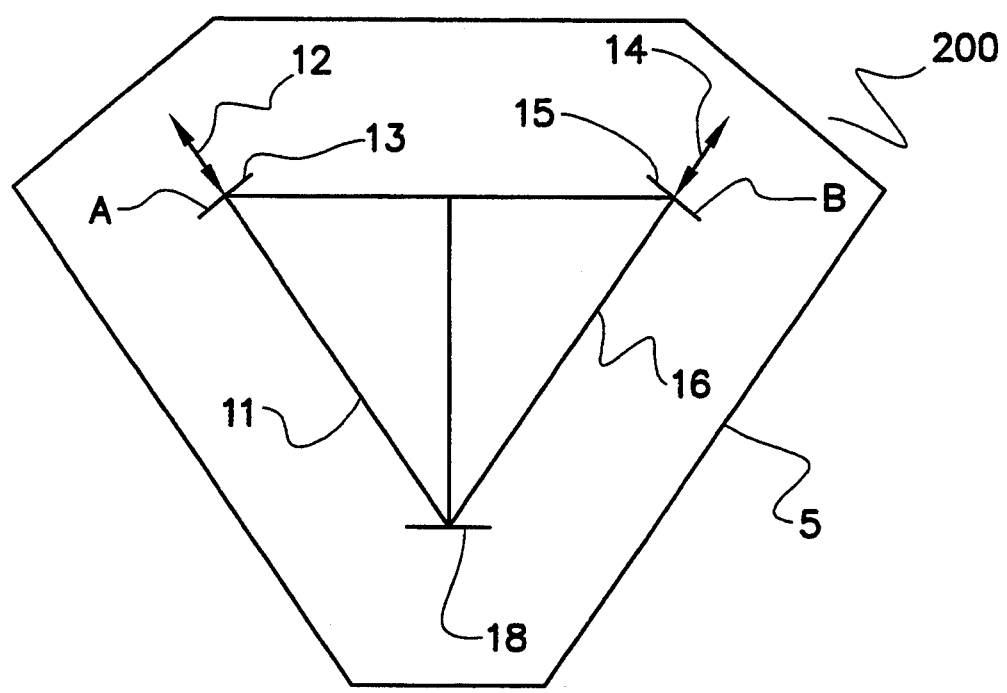
FIG. 1A shows a laser gyro of the method of the invention.
Figure 1B:
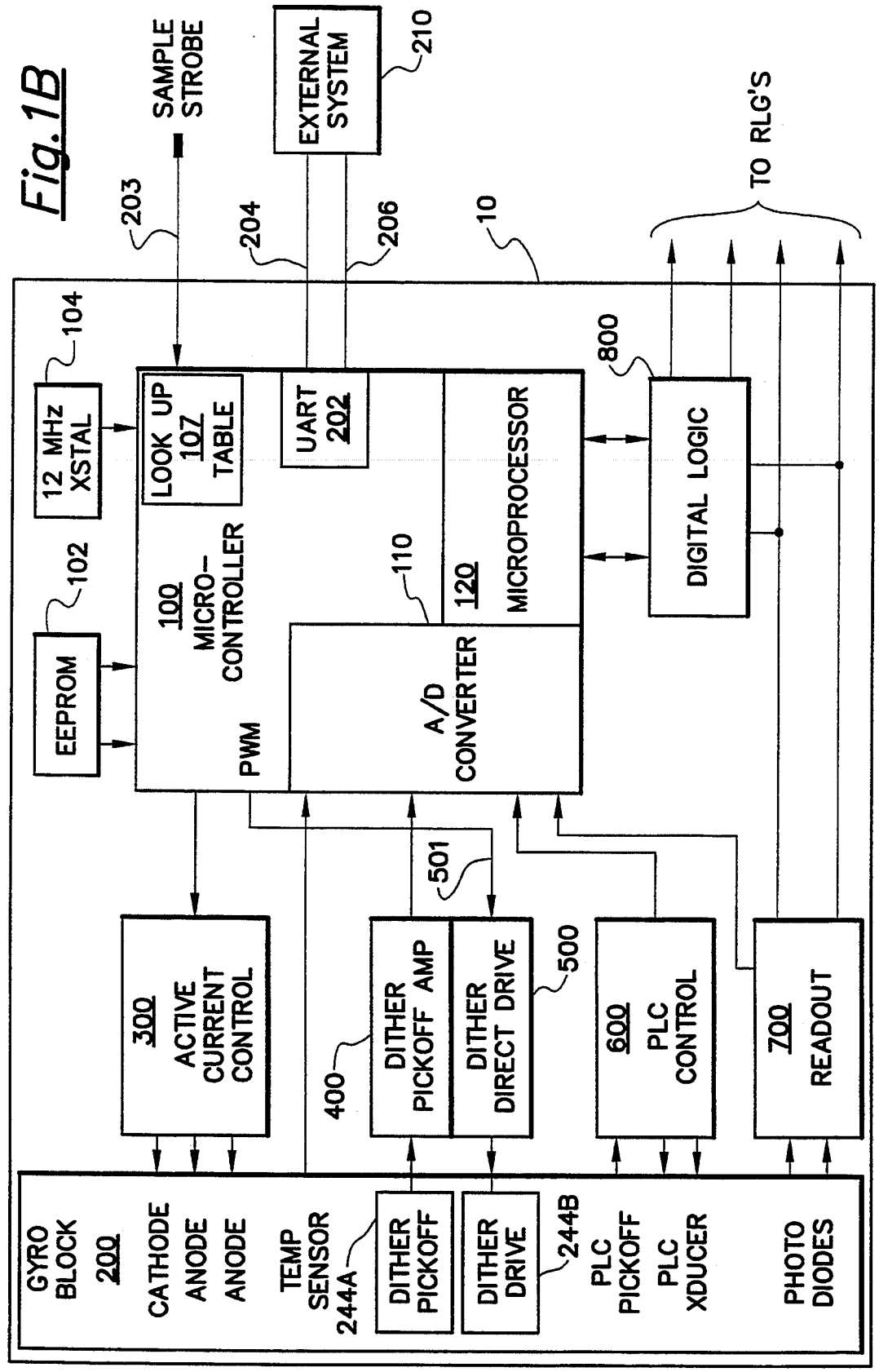
FIG. 1B shows a microprocessor controlled laser gyro of the method of the invention.

Referring now to FIG. 1B which shows a block diagram of one embodiment of a modular laser gyro employing the novel features of the present invention. The instant invention will be explained by way of example embodiments. Those skilled in the art having the benefit of this disclosure will appreciate that the examples herein are by way of illustration of the principles of the invention and not by way of limitation. Laser gyro 10 includes a microcontroller 100, a laser gyro block 200, an active current control apparatus 300, dither pickoff amplifier 400, direct digital dither drive 500, a path length control (PLC) device 600, a readout 700, and digital logic 800. Digital logic 800 may advantageously comprise a gate array register configured in accordance with well known logic techniques. The microcontroller 100 further includes a communications device such as a universal asynchronous receiver/transmitter (UART) 202 which communicates to an external processing system 210 through transmit line 204 and receive line 206.

In one embodiment of the invention the microcontroller 100 comprises an Intel model no. 80C196KC microcontroller. The microcontroller is commercially available and includes timers, a real time clock, high speed logic, and content addressable memory (CAM).

Figure 2:
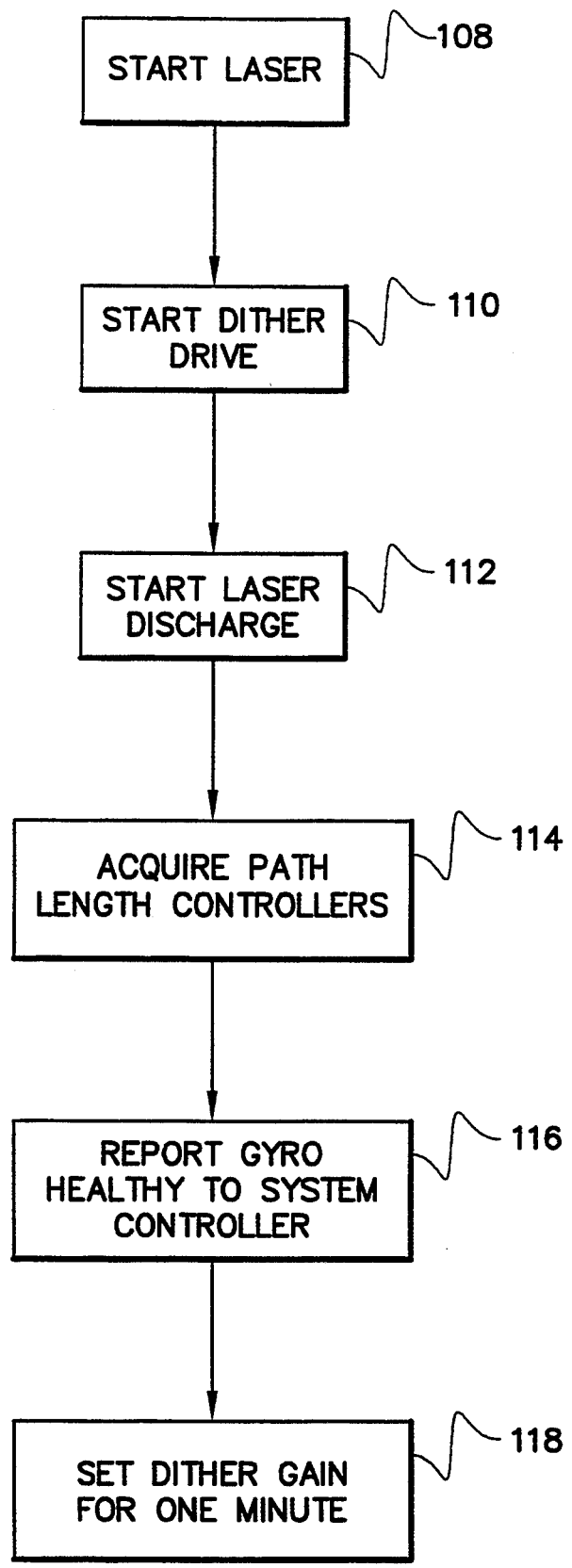
FIG. 2 shows a start up procedure process flow diagram.

Now referring to FIG. 2 which shows a method of starting the laser gyro with a microcontroller in accordance with one aspect of the invention. The laser gyro 10 start up procedure has three fundamental phases including (1) starting the laser dither drive, (2) starting the laser discharge, and (3) acquiring the path length controllers. The laser dither has to be started initially. In one preferred embodiment of the invention the laser dither must be started before the laser discharge is started. After the laser discharge is started the path length controllers may be acquired to perform some calibration functions. In an alternative embodiment of the invention the dither, laser discharge, and path length control can all be started simultaneously.

In the method shown in FIG. 2 the gyro is started in process block 108. The start up procedure then starts the dither drive in process block 110. The laser discharge in process block 112 is started. The path length controllers are then acquired in process block 114. If all the systems described above start up the gyro reports a health status in process block 116.

In one preferred embodiment of the invention the operating parameters of the ring laser gyro are stored in a nonvolatile memory look up table 107 as shown in FIG. 1B. These operating points are used by each of the start processes of the invention to start the gyro 10 at the last known operating points. Use of the last known operating points helps all the systems of the gyro to come up in a minimal amount of time with an immediate high level of performance. In one alternate embodiment of the invention the gain of the dither is set high for one full minute after the successful starting of the gyro as shown in process block 118.

During the acquire PLC step 114 the volts per mode of the laser gyro may be calibrated. This is an optional step which is further described hereinbelow.

Now referring jointly to FIG. 1B and FIG. 3A which shows a modular gyro start up timing diagram. Actual timing parameters are given herein for one example embodiment of the invention and are not intended as a limitation of the invention to the stated timing parameters. The timing diagram has a set of procedures whose names are labeled on the left of FIG. 3A. Each procedure executes at certain times shown to the right in the timing diagram portion of FIG. 3A. Each operation is shown with a corresponding execution time. Each corresponding execution time indicates whether the operation listed will start.

The gyro 10 is powered on at event 301 at time T equals 0. The gyro 10 goes through a reset sequence in 302 for approximately 100 milliseconds beginning at time $T_0$. During this period of time internal microcontroller hardware functions are initialized, microcontroller IO ports, and $E^2PROM$ 102 information are read into microcontroller scratchpad RAM. The gyro 10 enters the dither closure loop event 304 which begins at time $T_1$. At event 305 the gyro 10 reads a dither amplitude and frequency from the EEPROM 102 from time $T_1$ to time $T_E^2$. The gyro 10 then executes event 306 to read the noise amplitude from the EEPROM 102 from time $T_1$ to time $T_2$. The gyro then drives the dither to a 50% duty cycle through pulse width modulator signal 501 starting from time $T_1$ through time $T_2$. This 50% duty cycle occurs for about 200 milliseconds. The gyro loop is closed at event 308.

The laser gyro start up method of the invention then executes event 309 to enter the active current control loop. The gyro 10 then executes event 310 which initializes the active current control set current that was previously read from the EEPROM. The set current is written to a microcontroller I/O port. The gyro then executes event 312 to turn on a start LED and a 60 Khz 10% duty cycle signal at time $T_E^2$ through time $T_4$. The gyro 10 then waits for $T_4$ to turn off the LED and 60 KHz 10% duty cycle signal when current in legs one and two, $I_1$ and $I_2$ respectively are within limits. This event determines $T_4$ in event 314. Event 315 is executed when current in legs one and two, $I_1$ and $I_2$, are within limits for 10 milliseconds.

The gyro 10 then executes event 317 to enter the path length control loop. The gyro executes event 319 to read the temperature during the time period $T_1$ to $T_E^2$. The gyro then executes event 321 to read the path length control mode from the path length control mode table from the EEPROM 102 from time $T_1$ to time $E_2$. The gyro 10 then executes event 323 to read the path length control monitor voltage from the A/D converter from time $T_1$ to time $T_E^2$. The gyro 10 then executes event 325 to drive the path length controllers with the proper priority. The gyro 10 then executes event 327 to continue to seek the correct path length until the error in the path length is less than 0.1 volts from $T_4$ to $T_5$. The path length control start up loop is closed at event 331 at time $T_5$. In event 333 if the error is greater than 0.1 volts the initialization process fails in which case the laser gyro reports its status.

Now referring to FIG. 3B which shows the bias drift improvement (BDI) drive event at 335 starting at time $T_1$. The process proceeds to then execute step 336 to read the volts per mode at time $T_1$ to $T_E^2$. The gyro then executes event 338 to set the pulse width modulation at 50% duty cycle for the bias drift improvement from $T_E^2$ to $T_5$. The gyro 10 then executes event 340 to begin the bias drift improvement incrementation 1 count every 0.1 seconds.

The gyro 10 then executes the dither stripper loop in step 341 which reads the old dither stripper constant from the EEPROM 102 in event 343. The gyro 10 then executes event 345 to use a high gain until the rate of change is less than 1% per second from time $T_5$ to $T_{A/D}$. The gyro then reduces the gain at event 347 at time $T_{A/D}$.

Gyro built-in test (BIT) events are executed in event 350. The gyro 10 executes event 351 from time $T_1$ to time $T_{EPROM}$ and then executes events from 353 through 368 in the A/D conversion window $T_{A/D}$ to $T_{OK}$. Built-in test functions are then done some of which include the following: read the readout intensity monitor for the A mirror in event 353, read the readout intensity monitor for the B mirror at event 355, check the path length controllers in event 357, check dither error in event 359, check that the dither stripper constants are unchanged in event 360, check that the leg currents are within limits in event 361, check that the LIM is within limits in event 363, check that the temperature is within limits in event 365, and in event 368 at time $T_{OK}$ send the "OK" or "not OK" health status signal.

Figure 4A:
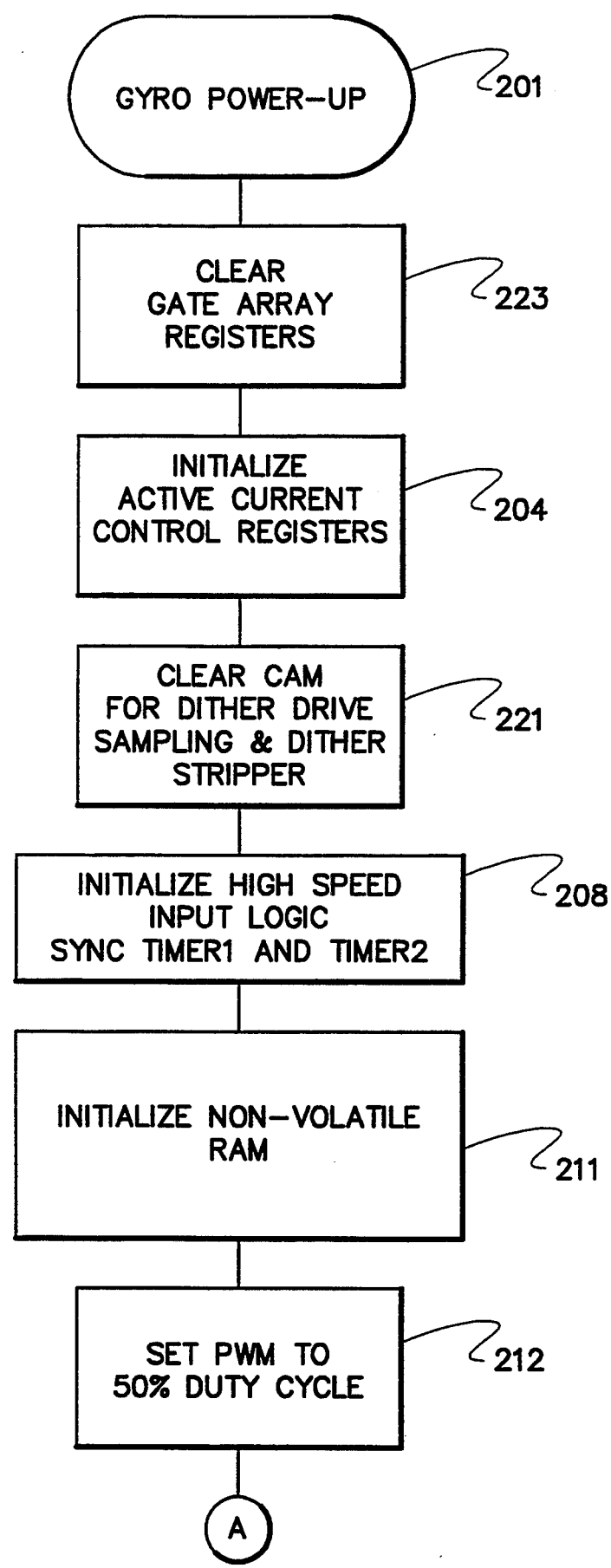
FIG. 4A shows an initial portion of a start up sequence of a laser gyro of the invention from laser gyro power up to setting the pulse width modulation to a 50% duty cycle.

Now referring to FIG. 4A which shows a detailed start up sequence process for the laser gyro of FIG. 1B following the timing diagrams of FIGS. 2A and 2B. The process begins by starting the gyro 10 by powering it up in process flow step 201. The process then flows to step 223 to clear the gate array registers. The process then flows to 204 where the active current control register is initialized. The process then flows to process block 221 where the content addressable memory (CAM) is cleared for the dither drive sampling and dither stripper sampling functions. The process then flows to 208 where the high speed input logic is initialized and timers 1 and 2 are synchronized. The high speed input logic is used to capture a sample strobe signal from the system controller. The sample strobe is used to synchronize multiple gyros in the system. The laser gyro is always triggering on the low-high transition of the sample strobe.

The process then flows to step 211 to initialize the nonvolatile ram, EEPROM 102, which contains initialization constants and run parameters for the laser gyro's various algorithms. The process then flows to step 212 where the pulse width modulation of the bias drift improvement circuit is set to a 50% duty cycle to disable the bias drift signal.

Figure 4B:
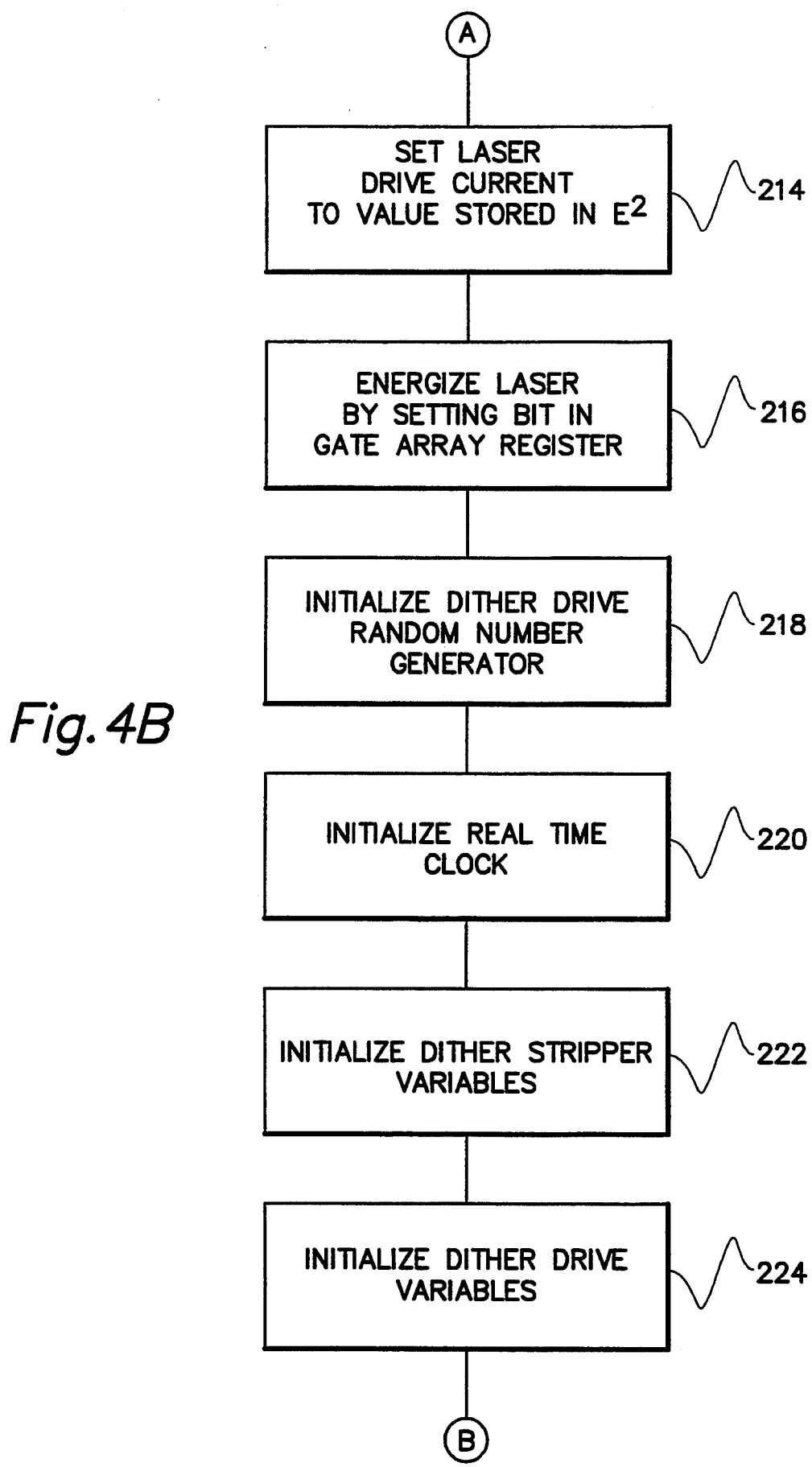
FIG. 4B shows a portion of a method for starting a laser gyro from setting a laser drive current to initializing dither drive variables.

Now referring to FIG. 4B which continues the initialization method of the laser gyro. The process then flows to process block 214 to set the laser drive current to a value stored in the EEPROM 102. The initialization process then flows to step 216 where the laser is energized by setting an energizing bit in the gate array register. The process then flows to 218 to initialize the dither drive random number generator. The process then flows to 220 to initialize the real time clock. The process then flows to 222 to initialize the dither stripper variables used in the dither stripper method of the invention. The process then flows to step 224 to initialize the dither drive variables.

Figure 4C:
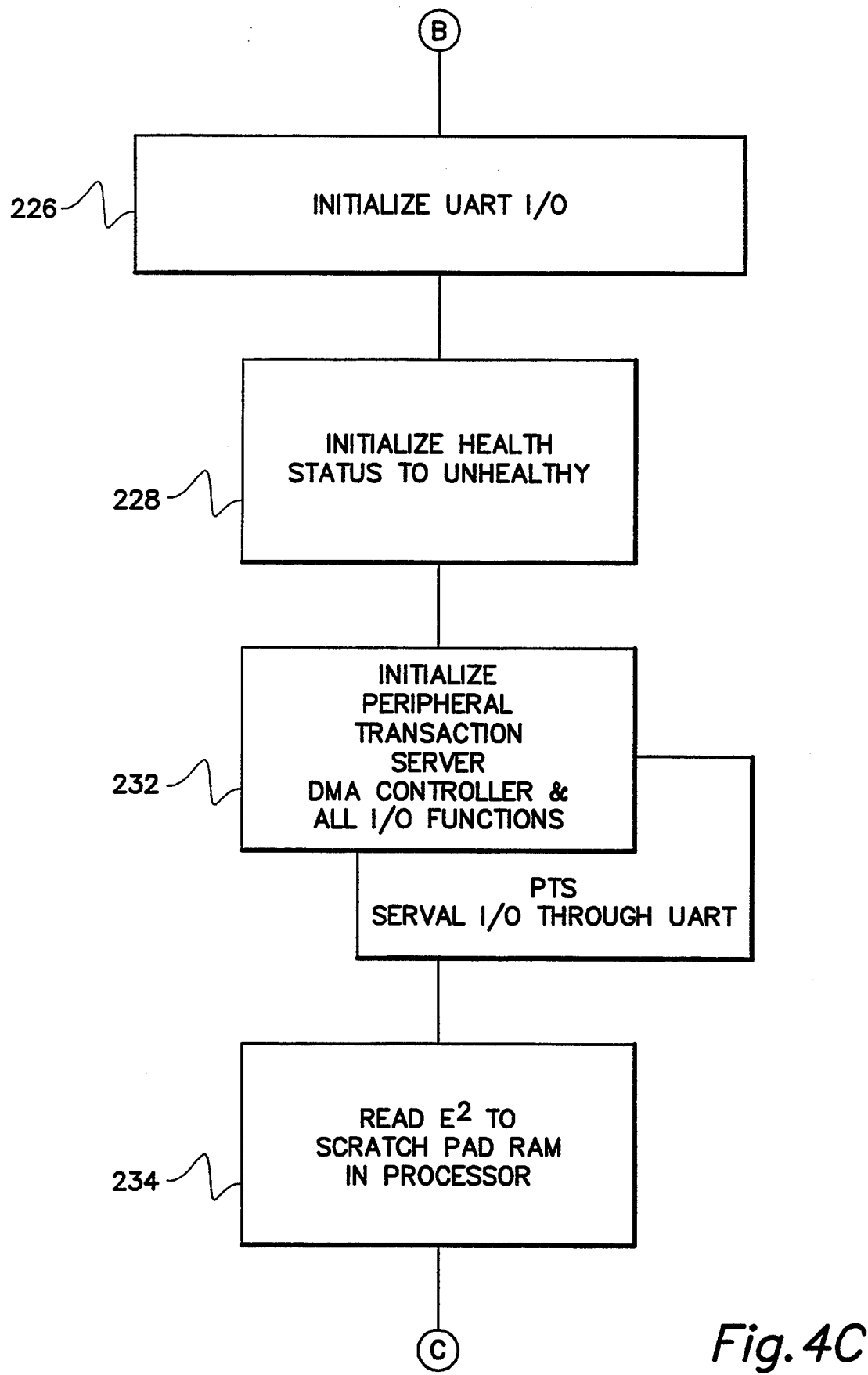
FIG. 4C shows a part of a method of the invention for starting a laser gyro from initializing a UART IO system to reading an EEPROM in a scratch pad RAM.

Now referring to FIG. 4C which continues the initialization method of the laser gyro. The process then flows to step 226 to initialize the UART IO which sends and receives data from the external processing system 210 controlling the modular gyro. The UART 202 communicates inertial navigation data in the form of delta theta data and communicates built-in test function data and command status data through two bi-directional IO lines 204 and 206.

The process then flows to process step 228 to initialize the status of the modular gyro to unhealthy. The process then flows to test the gyro. The process then flows to process step 232 to initialize the peripheral transaction server DMA controller and all IO functions including the peripheral transaction serial IO through the UART. The process flows to step 234 where the EEPROM is read to scratch pad ram in the microprocessor 120.

Figure 4D:
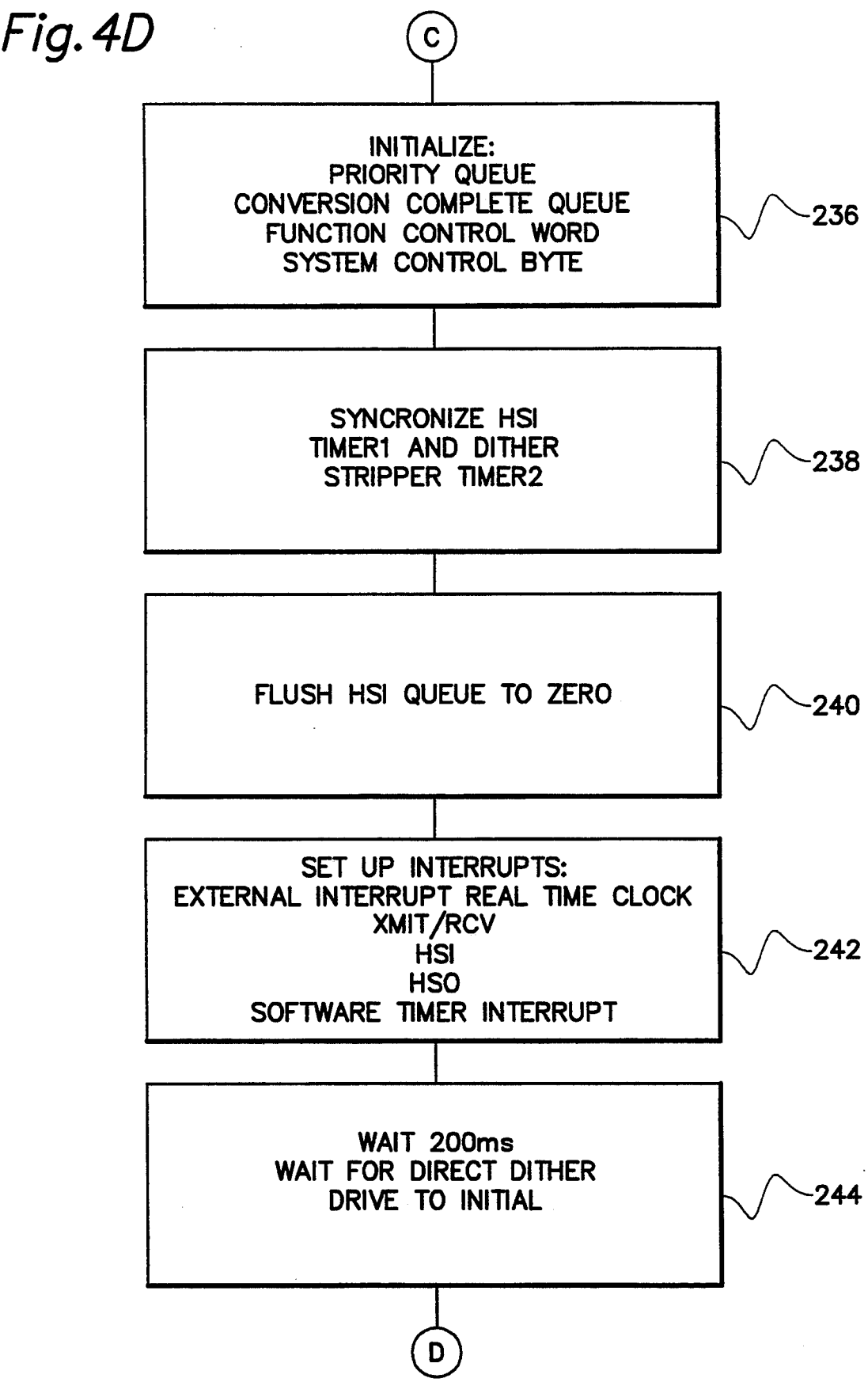
FIG. 4D shows a part of a method of starting a laser gyro from initializing a priority queue to waiting about 200 milliseconds for a dither drive to initialize.

Now referring to FIG. 4D which shows the process of initializing the laser gyro continuing with step 236 which initializes a priority queue, a conversion complete queue, a function control word, and a system control byte. The process then flows to step 238 to synchronize the two timers of the invention HSI timer 1 and the dither stripper timer 2. The process then flows to step 240 to flush the high speed interrupt queue to zero. The process then flows to 242 to set up the interrupts for the real time clock, the transmit receiver, the high speed input logic, and high speed output logic and software timer interrupt. The process then flows to 244 to wait 200 milliseconds for the direct dither drive to initialize.

Figure 4E:
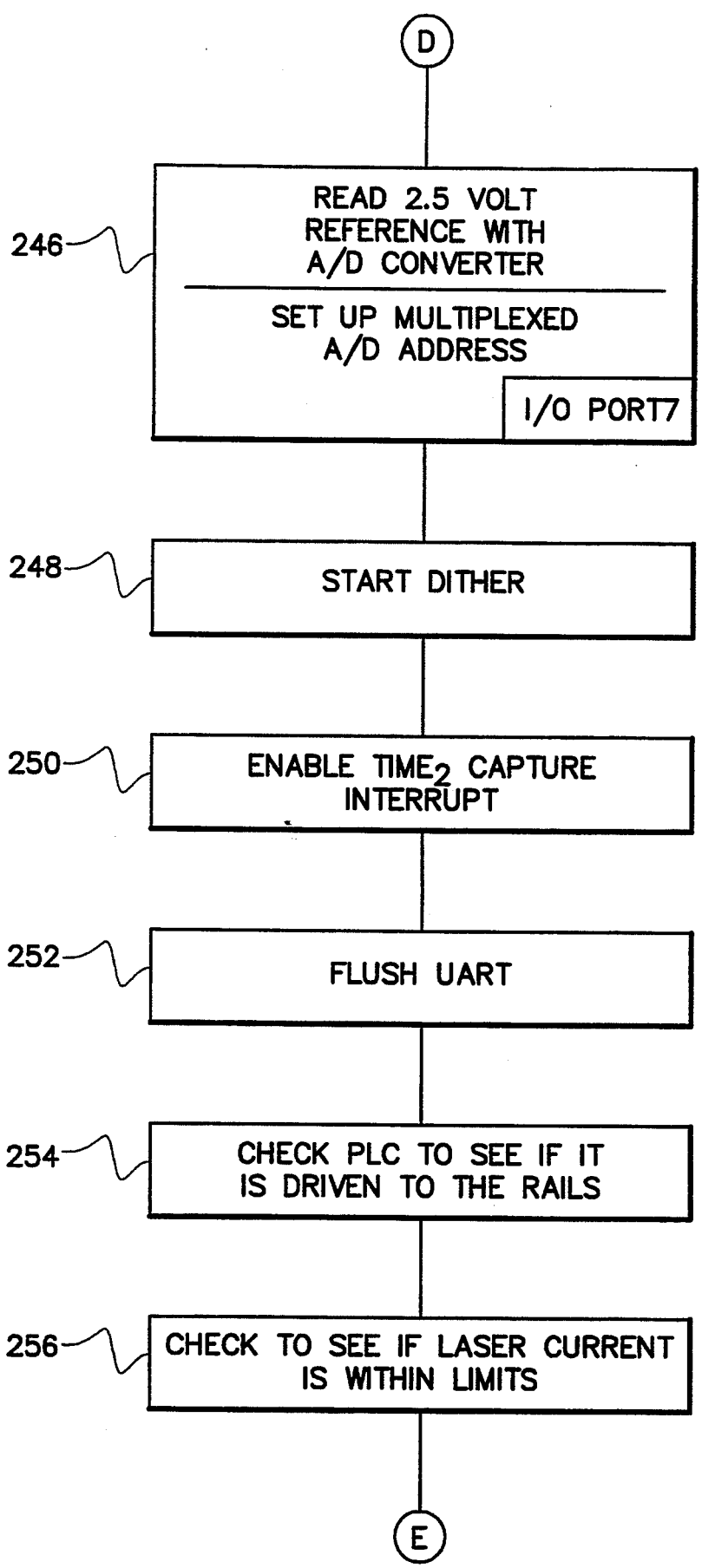
FIG. 4E shows a part of a method of starting a laser gyro from a step of reading a 2.5 volt reference to checking to verify whether a laser current is within limits.

Now referring to FIG. 4E where the process of initializing the gyro continues by reading a 2.50 volt reference with the A/D converter and setting up a multiplexed A/D converter address in IO port 7. The process then flows to 248 to start the dither drive. The process then flows to 250 to enable the $T_2$ CAP interrupt which captures the timing of the gyro system clock. The process then flows to 252 to flush the UART. The initialization process then flows to step 254 to check the path length controllers to see if they have been driven to the rails. The process flows to 256 to see if the laser current is within prescribed limits.

Figure 4F:
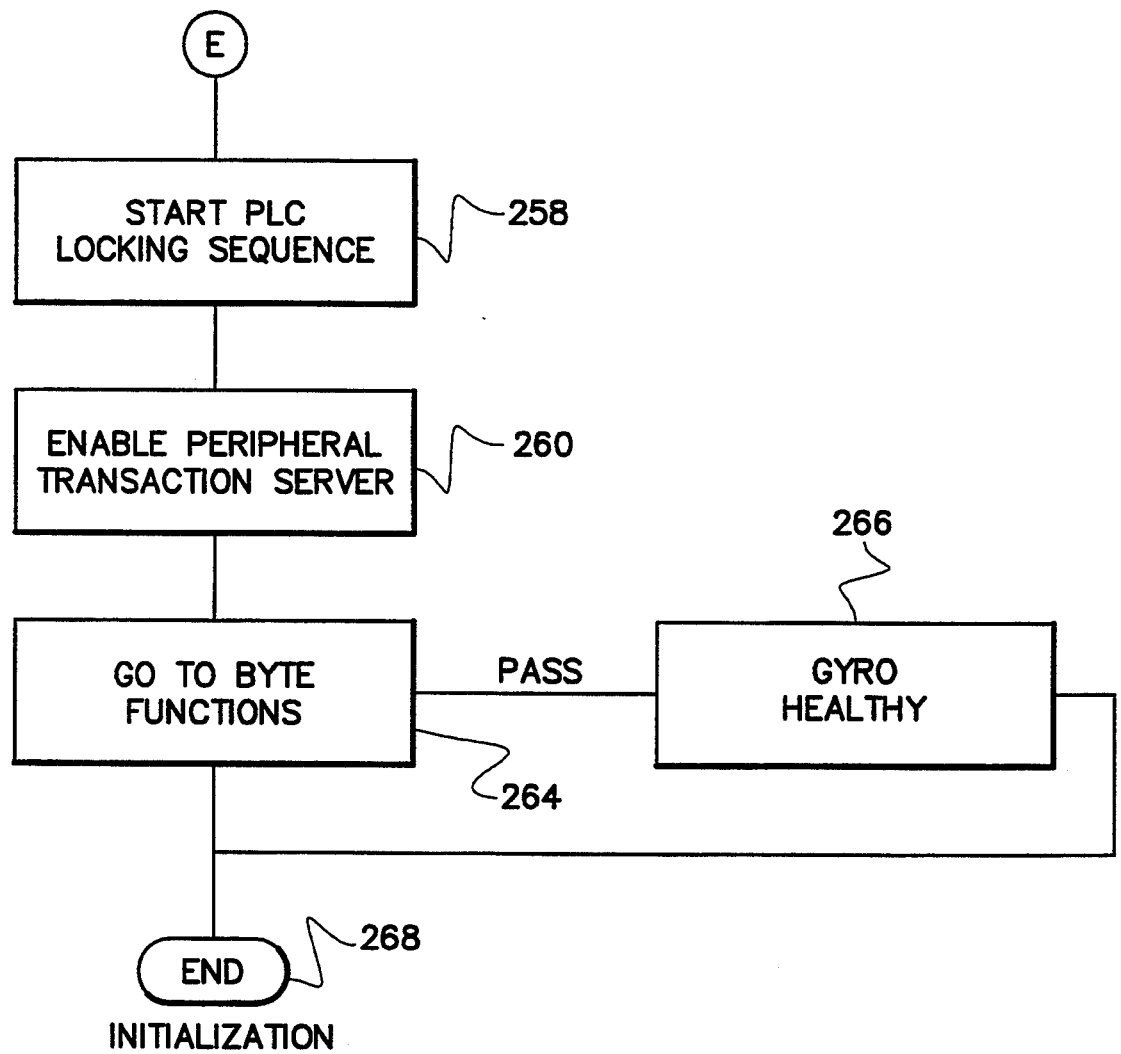
FIG. 4F shows a part of a method of starting the laser gyro from starting the path length control locking sequence to executing the built in test functions.

Now referring to FIG. 4F which shows the process continuing with starting a path length control locking sequence. The path length control locking sequence controls the mirror positions to "lock on" to a selected mode in response to a PLC signal. The process then flows to process step 260 to enable the peripheral transaction server. The process then flows to process step 264 to execute built-in test functions and set the gyro health to healthy in step 266 if all tests have been passed. The initialization process ends at 268.

Active Current Control

Figure 5A:
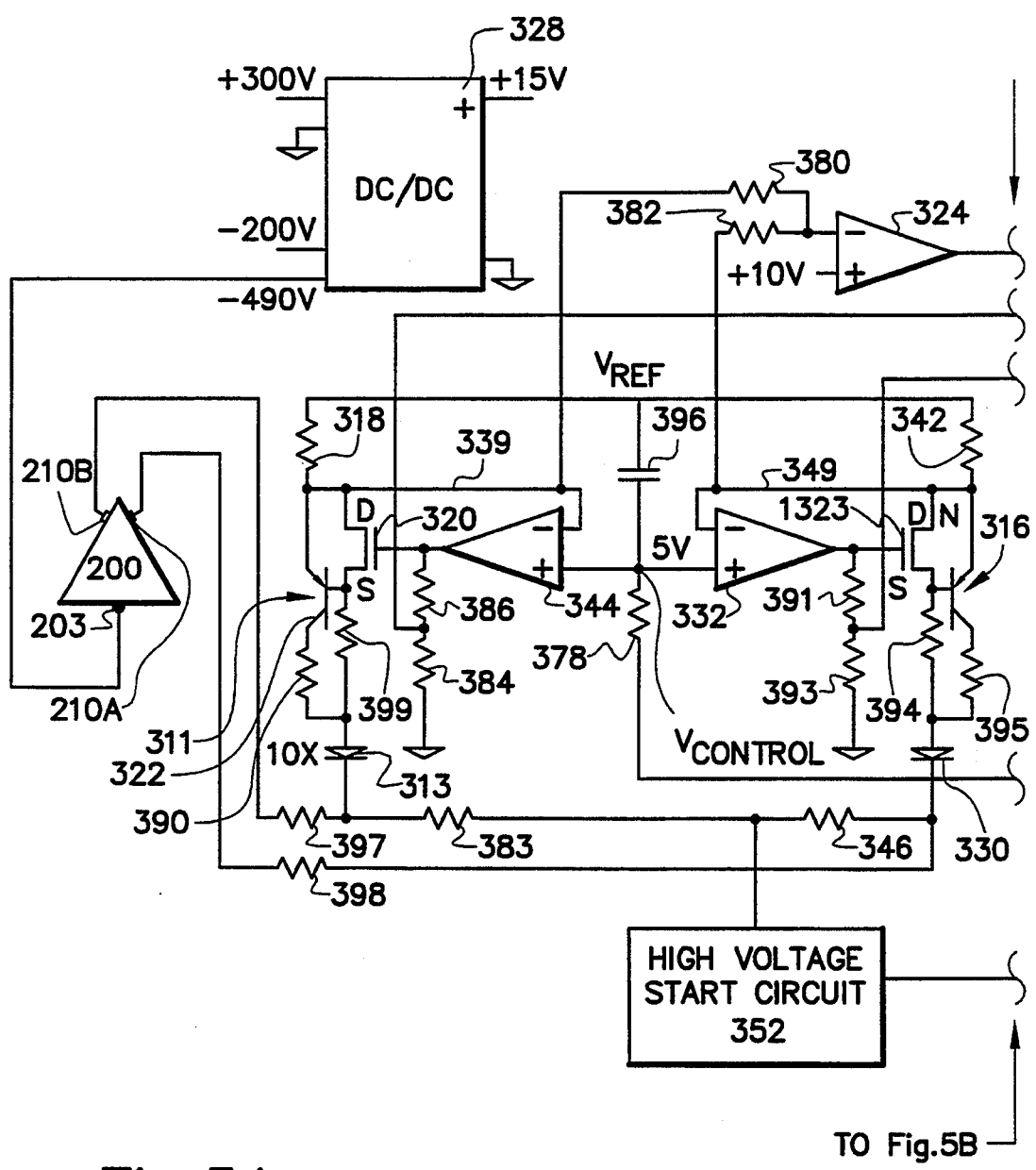
FIG. 5 schematically shows a circuit diagram of one example of an active current control circuit made in accordance with the present invention.
Figure 5B:
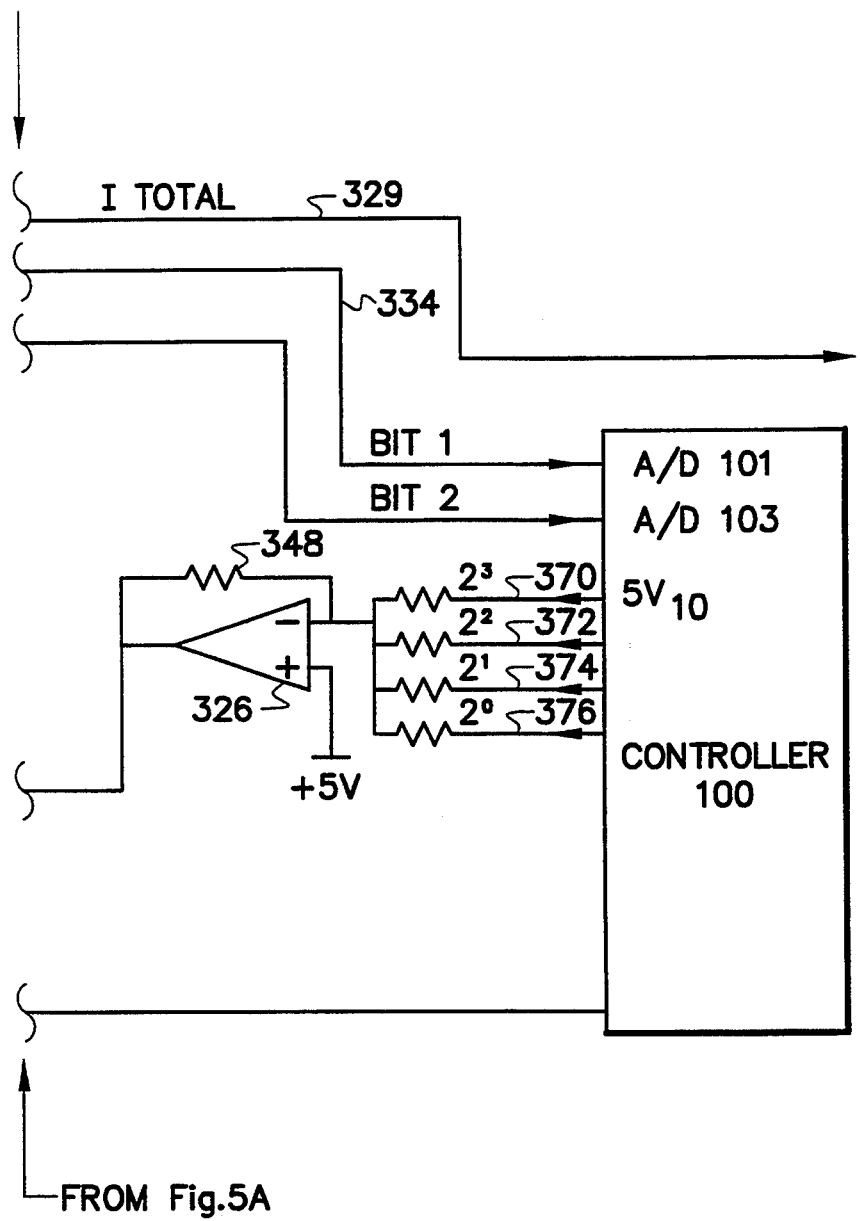

FIG. 5 schematically shows a circuit diagram of one example of an active current control circuit made in accordance with the present invention. Those skilled in the art having the benefit of this disclosure will recognize that the example embodiments described herein are by way of illustration, and not limitation, of the invention. The examples herein are provided in order to aid those skilled in the art in understanding the invention. The gyro block 200 is illustrated as a triangular block having two anodes 201A, 201B and a cathode 203. Those skilled in the art will understand that the ring laser gyro block can comprise other polygonal shapes, such as rectangular. Those skilled in the art will also recognize that various combinations and numbers of electrodes including anodes and cathodes may be used in the ring laser gyro without departing from the scope of this invention.

The active current control apparatus in this example includes first, second, third and fourth amplifying means 344, 332, 324, 326, first and second output transistor means 311, 316, first and second field effect transistor (FET) means 320, 1323, DC/DC conversion means 328 and high voltage start circuit means 352. The active current control apparatus is coupled to controller 100 and the ring laser gyro block 200.

The fourth amplifying means 326 is coupled to a gain resistor 348 at its inverting input. Also coupled to the inverting input are four input resistors 370, 372, 374 and 376. The controller 100 operates as a means which generates a digital control signal onto the four input resistors. The fourth amplifying means 326 substantially functions as a digital-to-analog converter wherein the four input resistors correspond to a four bit input in which the first input resistor 370 is the most significant bit and the fourth input resistor 376 is the least significant bit. The fourth amplifying means translates the digital control input from the controller 100 into a proportionate analog signal which is applied through resistor 378 to node $V_{control}$. Thus the active current control apparatus 300 can control the active current to within 4 bit accuracy at node $V_{control}$ which correspond to a 10 to 5 volt swing at $V_{control}$.

$V_{control}$ is further coupled to the non-inverting inputs of the first and second amplifying means 344, 332. Each of the first and second amplifying means 344 and 332 drives a field effect transistor 320, 1323 which, in turn, control transistors 311, 316 through which current flows to one of the anodes 201A and 201B on gyro block 200. Each of the first and second amplifying means and their associated components may be considered as one "leg" of the active current control. The output of the first amplifier 344, for example, is connected to the gate of a field effect transistor (FET) 320. FET 320 may advantageously be a DMODE FET having a threshold of from about −2 to −4 volts or an equivalent device. FET 320 may advantageously be, for example, an N channel FET such as a JFET or MOSFET with sufficiently low gate impedance to allow substantially all of the current in precision resistors 318, 342 to flow to anodes 210A and 210B. FET 320 controls the base drive to high frequency transistor collector 322. Feedback line 339 provides negative feedback to the first current control amplifier 344. The source of FET 320 is connected to feedback line 339. The drain of FET 320 is connected to the base of the first output transistor 311. The emitter of the first output transistor 311 is connected to the feedback line 339 and through resistor 318 to a first terminal of capacitor 396. The second terminal of capacitor 396 is connected to the node $V_{control}$.

In one embodiment of the invention, when fully charged, capacitor 396 maintains a nominal voltage potential of about +10 volts at its first terminal. The first output transistor 311 has its collector 322 connected through a resistor 390 to the anode of diode 313. Diodes 313 and 330 are high voltage diodes rated at, for example, about 5,000 volts, and serve to protect the active current control circuitry during start up of the ring laser gyro. The base of output transistor 311 is connected to the source of FET 320 and a resistor 399 which is also connected to the anode of diode 313. The cathode of diode 313 is connected through resistor 397 to anode 201B. The second amplifying means 332 is similarly arranged with its associated components, namely, FET 1323, the second output transistor 316 and resistance components 391, 393, 394, 342, 346 and the second diode 330 which is connected at its cathode to the second anode 201A. The first amplifying means 344 comprises a first leg of the driving circuit and the second amplifying means 332 and its associated components comprises a second leg of the circuit. Both legs operated in a similar manner to supply substantially equal current to the ring laser gyro. The first and second amplifying means 344, 332 may advantageously comprise operational amplifiers such as, for example, model number LM 2902 having less than about a 1 MHz bandwidth. The first and second transistors 311, 316 may advantageously be slightly reversed biased by 10 volts from base to collector in one example embodiment of the invention. This reverse bias reduces the effective capacitance between the base and collector, thereby improving the transistors' high frequency response.

A third amplifier means 324 may advantageously, optionally be included to provide an output signal 329 which is representative of the sum of the current $I_1+I_2$ in each leg of the ring laser gyro. The current sum is designated "I Total". An inverting input of the third amplifier means 324 is connected through resistor 380 to feedback line 339 and through resistor 382 to feedback line 349.

In this example, the cathode 203 of the ring laser gyro is kept at a constant voltage of, for example, in the range of about −425 to −460 volts through DC/DC converter means 328. In operation, DC/DC converter means 328 converts an input voltage of about +15 volts from an external power source to, for example, an output voltage of nominally in the range of about −450 to −490 volts.

Also optionally included in this example of a active current control as provided by the invention are built in test lines BIT 1 and BIT 2. BIT 1 and BIT 2 are coupled to first and second analog-to-digital inputs 101, 103 respectively of controller 100. BIT 1 and BIT 2 provide test signals which are employed by controller 100 to determine whether or not the active current control is in the proper operating range and that the operational amplifiers 344, 332 are not locked up at the high or low power supply limits also called positive or negative rails herein.

One example of a built in test that may be employed with the present invention is a high limit test coupled with a low limit test. The high limit test uses the controller 100 to supply a digital command signal to the fourth amplifying means 326 corresponding to a predetermined upper limit for total current. The BIT 1 and BIT 2 signals are then read by the controller 100 and compared by well known comparison means to a nominally acceptable maximum value. Similarly, the low limit test may test the active current control apparatus for a nominally acceptable minimum value. In this way the circuit apparatus can be tested to assure that the apparatus and the ring laser gyro are operating within acceptable limits and are not, for example, operating in a range too near the rails. For example, if one of the legs in the ring laser gyro failed to ignite, this would be an indication that one of the operational amplifiers 344, 332 was locked up at the positive rail.

It is important to the operation of each leg of the active current control to carefully select the resistors at the output of the current supply legs. For the first leg resistors 390, 399 and 397 must be selected with precision. Similarly, care must be taken in selecting resistors 395, 394 and 346 in the second leg of the active current control. In the first leg, for example, resistors 390 and 399 must be selected such that the voltage on collector 322 of transistor 311 remains relatively constant over the operating range of the current in the ring laser gyro. In one example of the invention resistors 390, 399 and 397 and their counter parts 394, 395 and 346 were selected to operate for a worse case BETA of 10 for PNP transistor 311, 316 at low currents and low temperatures of about −55 degrees centigrade. The selection of these resistors minimizes power dissipation in the transistors 311 and 316. In one example, current is supplied in the range of about 0.15 to 1 ma per leg. These limits are established by the impedance characteristics of the gas discharge and the current limits of the power supply.

Bias Drift Improvement

Figure 6:
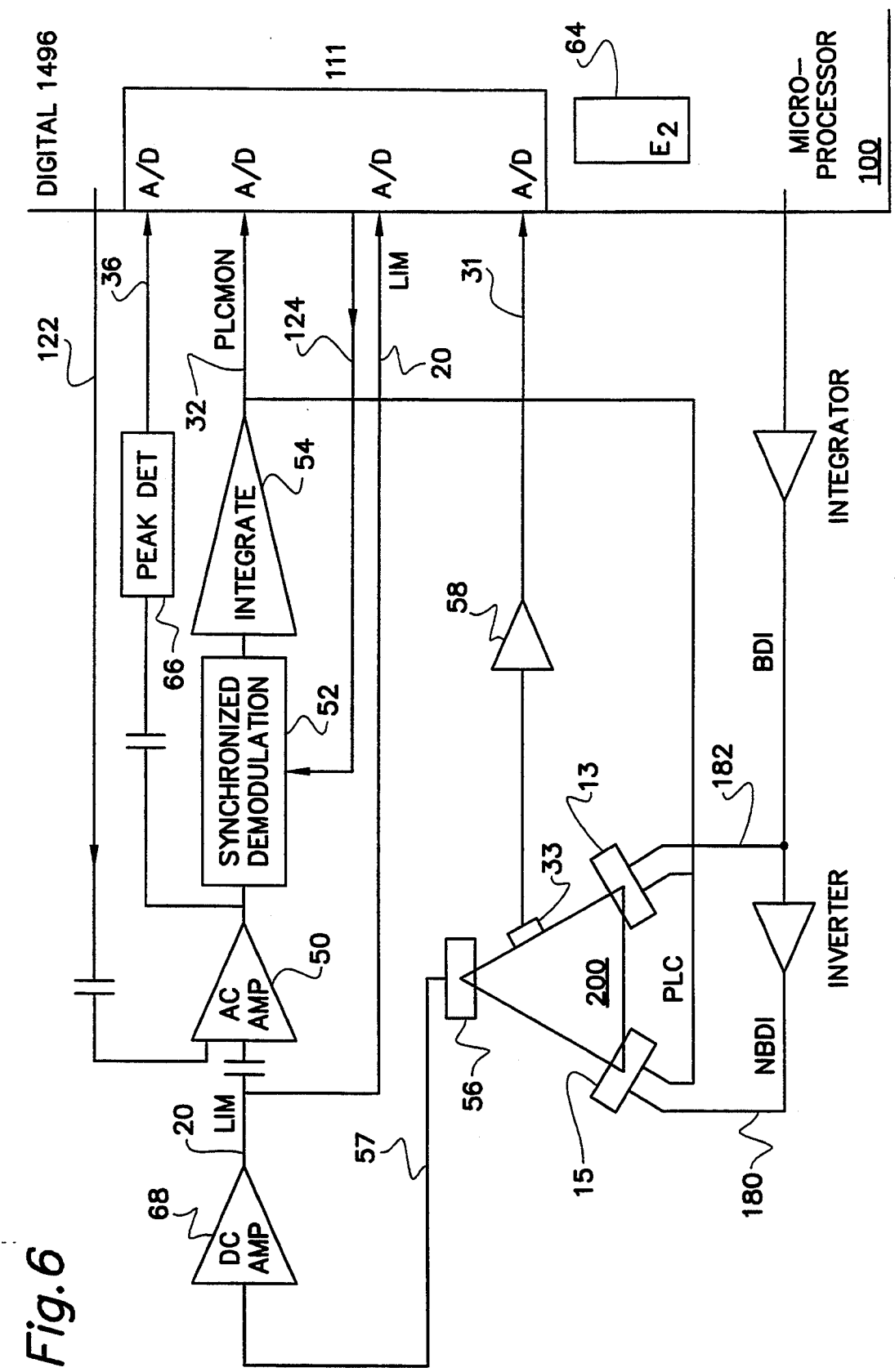
FIG. 6 shows one embodiment of the invention used to implement the bias drift improvement method of the invention showing a microprocessor controlling a path length control circuit with pulse width modulation.

Now referring to FIG. 6 which shows the apparatus of the invention used to control the path length transducers of the invention. The apparatus of the invention controls the path length transducers for mirror A and mirror B of the laser block 200. The laser block has a number of sensors including a temperature sensor 33 which sends a temperature signal which is amplified by temperature sensor amplifier 58 which provides a temperature signal 31 to the on board A/D converter 111.

The laser block 200 also has a power detect signal 57 which is picked up from photo diode 56 connected to DC amplifier 68 which provides the laser intensity monitor (LIM) signal 20. The gyro block 200 transducer mirrors A and B 13, 15 provide the principle means by which path length control is achieved. As the laser path is adjusted with the path length control transducers the laser intensity monitor signal 20 will vary. The invention provides a number of components that help process the laser intensity monitor signal into a useful set of signals including the laser intensity monitor signal 20, a path length control monitor signal 32 and a single beam signal 36.

The AC amplifier 50 receives the AC component of the laser intensity monitor 20. The output of the AC amplifier 50 is sent to a synchronous demodulator 52 which provides a signal to an integrator 54 which generates the path length control monitor signal PLCMON 32. The output of the AC amplifier 50 is also AC coupled to a peak detector 66 which provides a single beam signal 36. The AC amplifier 50 also has as an input from the sweep signal 122 which is synchronized to the switch signal 124. The synchronous demodulator 52 also provides a method by which the closed loop path from the laser intensity monitor through to the path length control monitor can be used to adjust the path length.

The high level circuit diagram of FIG. 6 illustrates one example of an apparatus to control path length. The synchronous demodulator provides a way of controlling the path length mirrors in a fashion such that the path length control transducers are continuously seeking the peak of a laser mode.

Figure 7:
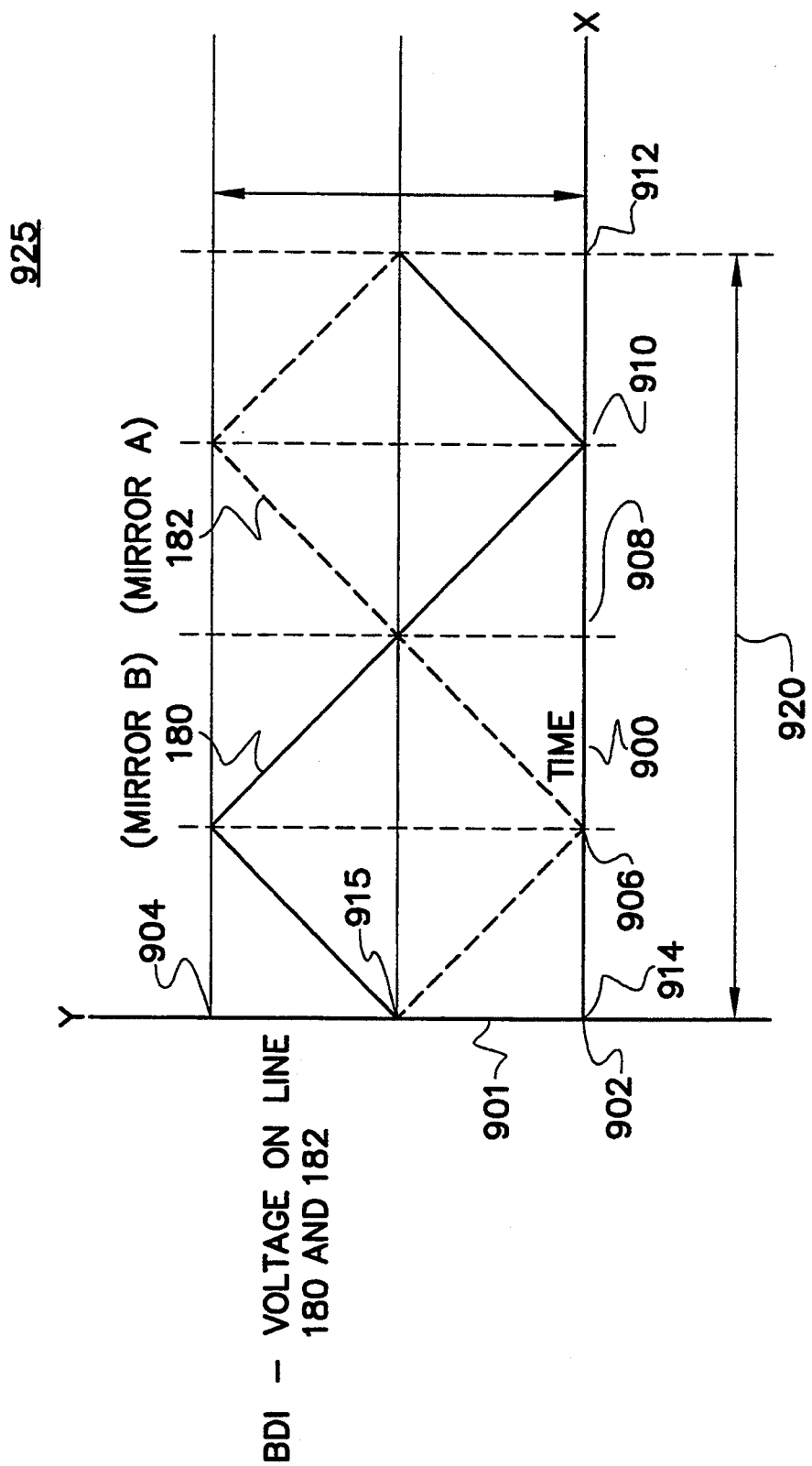
FIG. 7 shows a plot of a laser gyro bias improvement control voltage against time.

FIG. 7 shows the use of mirror A 13 which has been moved to cause the path length of the laser beam to move increasingly through two wavelengths of the laser. FIG. 7 also shows the use of mirror B 15 which has been moved to cause the path length of the laser beam to move decreasingly through two wavelengths of the laser. The X horizontal axis 900 shows time. The Y vertical axis 901 shows BDI control voltage. At all points in time the method of counter movement of the mirrors results in no net change in path length. Once the mirrors have traversed through their range of motion they reverse and move opposite their original direction. This motion is repeated continuously during the bias drift error compensation mode of the invention.

The entire BDI cycle 925 is run over a time period 920 no longer than the stability of the bias drift. In one preferred embodiment of the invention the time period 920 is 10 minutes. The BDI voltage 180 driving mirror B 15 is run from an average value 915 at time 914 to a high positive value 904 at time 906 back to the average value at time 908 to a high negative value 902 at time 910 back to the average value at time 912. The BDI voltage 182 driving mirror A is run from an average value 915 at time 914 to a high negative value 902 at time 906 back to the average value 915 at time 908 to a high positive value 904 at time 910 back to the average value at point 912. Driving the BDI control voltages 180 and 182 in this fashion moves the path length control mirrors through the BDI cycle without changing the path length and while also not effecting the ability of the laser gyro to provide an accurate gyro response.

Built In Test

Figure 8:
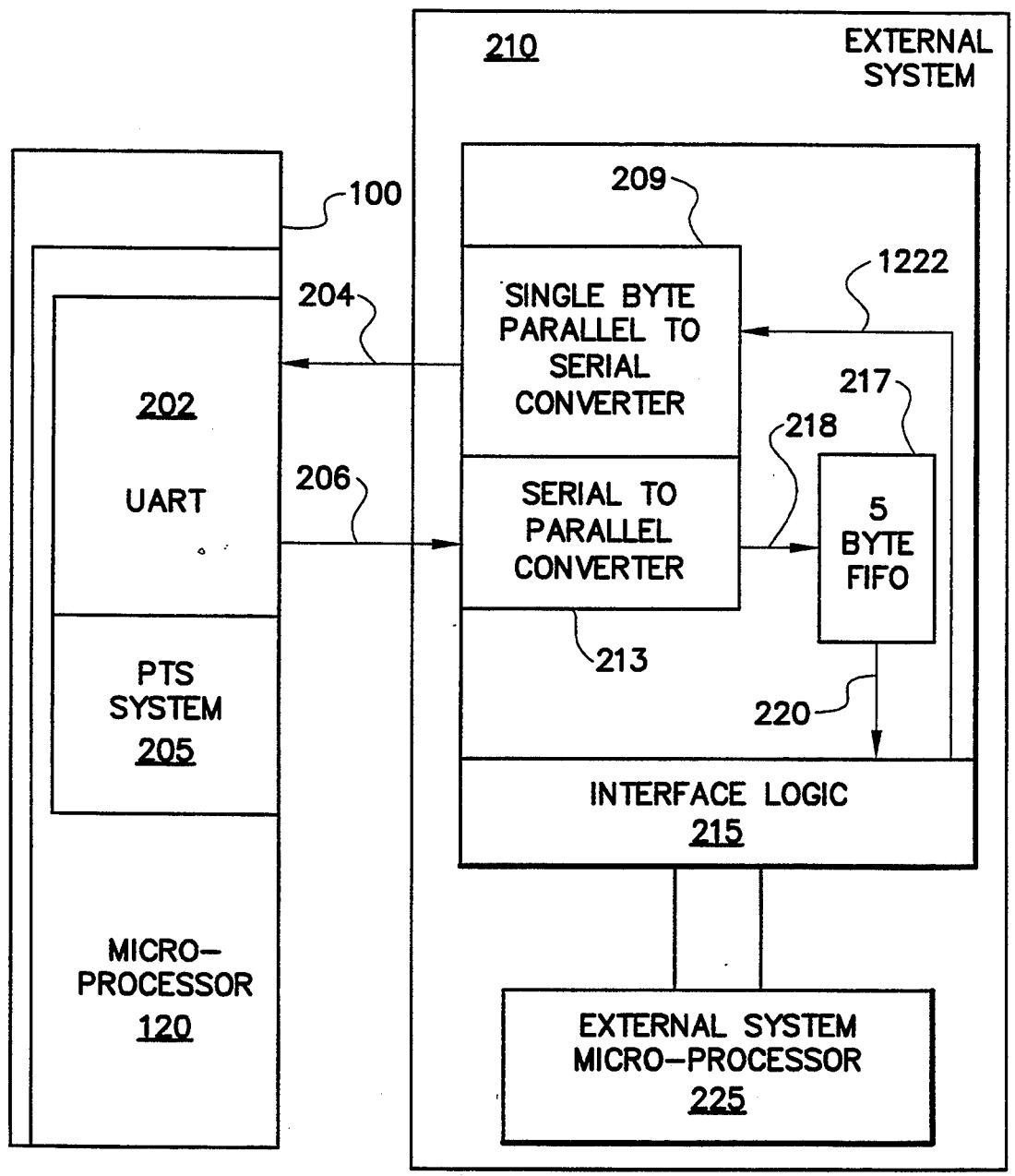
FIG. 8 shows one example of a hardware schematic diagram for the high speed communication system of the method of the invention.

FIG. 8 shows a hardware diagram for one example of the apparatus of the invention used to interface a laser gyro microcontroller 100 to an external processing system 210. The external processing system 210 includes a microprocessor 120. The microprocessor 120 includes a high speed UART 202 controlled by a peripheral transaction system 205 The UART 202 communicates to the external processing system 210 on transmit line 206 and receive line 204. Line 206 is connected to the external processing system 210 through a serial to parallel converter 213. The serial to parallel converter 213 provides information on line 218 to a five Byte first-in-first-out register (FIFO) 217. The five Byte FIFO 217 interfaces to processor interface logic 215 which provides information to an external system microprocessor 225 for further processing. The interface logic 215 provides commands from the external system microprocessor 225 through serial interface line 1222 to a single byte parallel to serial converter 209. The single byte parallel to serial converter 209 provides information to the laser gyro microprocessor 120 on receive line 204.

The apparatus of FIG. 8 provides a way of communicating high speed serial data into a queue in the serial to parallel converter 213 which provides a five Byte FIFO 217 with high speed interface data that can be accepted by the external system microprocessor 225. The apparatus of FIG. 2 provides a bidirectional means by which information can flow between the two processors 120 and 225 at a very high rate.

The microprocessor controlled configuration and control of the laser gyro 10 is accomplished through the communication of a command set. These commands are generally defined in four types. The four command types for the laser gyro are, first the parameter load commands, second the gyro control commands, third the gyro status commands, and fourth the gyro calibration and diagnostics commands.

Parameter load commands provide a way of loading constants into the microprocessor's EEPROM 102. Parameter load commands can be of two types. The first type is a one-word command, the second type is a two-word command. In one example embodiment of the invention a word is defined as sixteen bit unsigned quantity.

Two-word parameter load commands fall into the types of commands requiring a two byte physical address in the EPROM, for example, command 0 hexadecimal loads the K1 constant into the EPROM at word addresses 0 and 1, command 1 loads the constant K2 into word addresses 2 and 3, etc. These commands occupy the 0-F hexadecimal address location. These constants occupy word addresses 0-1 FH in the EEPROM 102. The following table lists two-word parameter load commands.

TABLE A

1. CMD 0H—Load compensation constant K1.
2. CMD 1H—Load compensation constant K2.
3. CMD 2H—Load compensation constant K3.
4. CMD 3H—Load compensation constant K4.
5. CMD 4H—Load compensation constant KI.
6. CMD 5H—Load compensation constant KI2.
7. CMD 6H—Load compensation constant K7.
8. CMD 7H—Load compensation constant K9.
9. CMD 8H—Load Serial Number.
10. CMD 9H—Load Build Date.
11. CMD AH—Load Alignment X.
12. CMD BH—Load Alignment Y.
13. CMD CH—Load Current (min,max) Limits; microamperes.
14. CMD DH—Load Power (min,max) Limits. Power is in milliwatts.
15. CMD EH—Load initial Dither stripper AGC gain constant.

One-word parameter load commands are loaded into EEPROM starting at address 40H. These command codes represent the physical address in the EEPROM where data is to be stored. These commands are listed below with explanations in Table B.

TABLE B

1. CMD 20H—Load Operating Hours. This command initializes the operating hours to a value specified in command parameter 1 into the EEPROM.
2. CMD 21H—Load Dither Frequency. This command loads the dither frequency Hz into the EEPROM.
3. CMD 22H—Load Dither Command Angle. This command loads the dither command angle into the EEPROM. This value is used by the modular gyro system during power-on to set the initial command angle.
4. CMD 23H—Load PLC Mode Ref Voltage. This command loads the PLC mode reference voltage into the EEPROM.
5. CMD 24H—set laser run current. This is a 4 bit value to set the initial laser run current.

Gyro control commands are those commands that either set the gyro operating parameters or alter gyro dither angle or write parameters check sum. The set gyro operating parameters commands changes the operating modes of the gyro. Various bits are associated with various operating states of the gyro. The command code for the set gyro operating parameters command is 30H. Bit 0 of the command selects either constant current or constant power operation. Bit 1 is used to restart the system. Bit 2 is used to turn the compensation on or off for the gyro. Bit 3 is used to turn the noise for the gyro on or off.

The next command used in the gyro control command set is to alter gyro dither angle command. This command allows the dither angle to be altered to a value specified by the first parameter word in the command. The command code for this command is 31H.

The next command for the gyro control command set is the write parameter's check sum command. This command generates an overall check sum on the parameters currently in the EEPROM 102 and stores this value in the EEPROM 102. This check sum is used to determine whether or not the EEPROM 102 was loaded with the correct information or expected information.

The gyro read status commands allow gyro system functions to be monitored on the serial output data port 206. These commands begin at address 40H. The first read status command is command 40H which is read current control loop current command. This command returns the current control loop current from the gyro 10. The information returned is in microamperes. The read temperature command address 41H returns the current gyro temperature in degrees Kelvin. The readout intensity monitor (RIM) command address 42H turns the current RIM signal level. The read operating hour's command returns the number of hours to the nearest hour that the gyro 10 has been in active operation. This command's address is 43H. The read time to fail command address 44H returns the remaining number of hours the gyro has until a failure may occur. Command addresses 50H–5FH reads the calibration constants used for the gyro. The final commands are the enter calibration or diagnostic modes commands which are commands that enable the gyro to calibrate itself or diagnose any potential problems.

Figure 9:
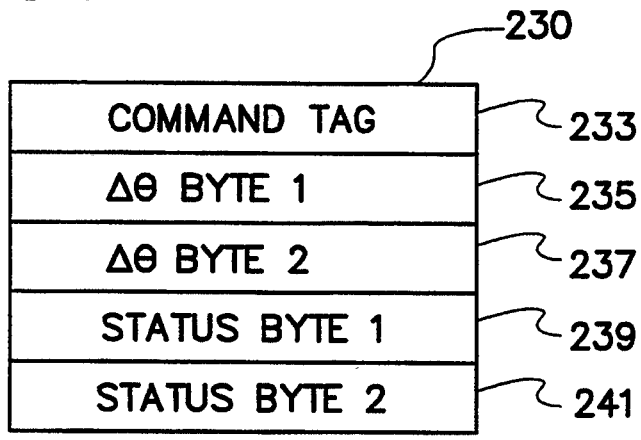
FIG. 9 shows an output frame for a command for a laser gyro.

Referring now to FIG. 9 which shows the structure of the UART output to command buffer for the microcontroller 100 UART in 202. When information is sent from the microcontroller 100 to the external system microprocessor 225 the information is transmitted in a five byte structure called a frame. The output frame 230 comprises a command tag 233, a delta theta byte 235, a delta theta byte 237, a first status byte 239, and a second status byte 241. The status tag 233 is a reference to the type of status data the laser gyro system status tag is sending status data includes such information as compensation coefficients, path length control voltage levels, laser gyro temperatures and the status of the last command sent to be executed. The delta theta byte 235 and delta theta byte 237 are the dither stripped compensated inertial navigation measurements of the laser gyro 10. Status byte 1 239 and status byte 2 241 are the information resulting from the command.

The serial output data character format is asynchronous and 10 bits in length in one embodiment of the invention. The data is in the format of one start bit, one stop bit, and 8 data bits. In one embodiment of the invention the maximum clock rate is 12 megahertz resulting in a 750 Kbaud communication Rate.

Figure 10:
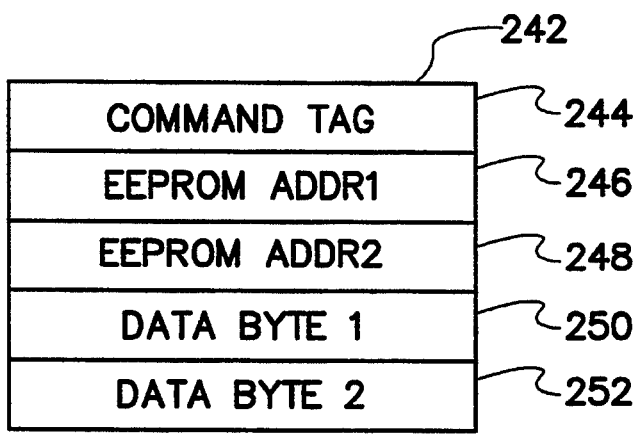
FIG. 10 shows an input frame for communications from an external host system to a laser gyro.

Now referring to FIG. 10 which shows the laser gyro of the invention's input frame format. The input frame 242 is composed of a number of elements. The first element is a command tag similar to the output frame 230. Command tag 244 provides the microprocessor 120 of the laser gyro a validity flag used to verify a write command. The EEPROM address 246 and EEPROM address 248 contains the location in the EEPROM 102 of the data to be stored. The data byte 1 and data byte 2-50 and 252 provide the actual data to be stored into the EEPROM 102 at EEPROM address 246 and EEPROM address 248.

Data is sent through the output channel from the gyro 10 to the external processing system 210 continuously at a predetermined update rate. This is to provide inertial navigation data to the external processing system 210 from the microprocessor 120 that is current and that may also include other information encoded in the status bytes.

Figure 14:
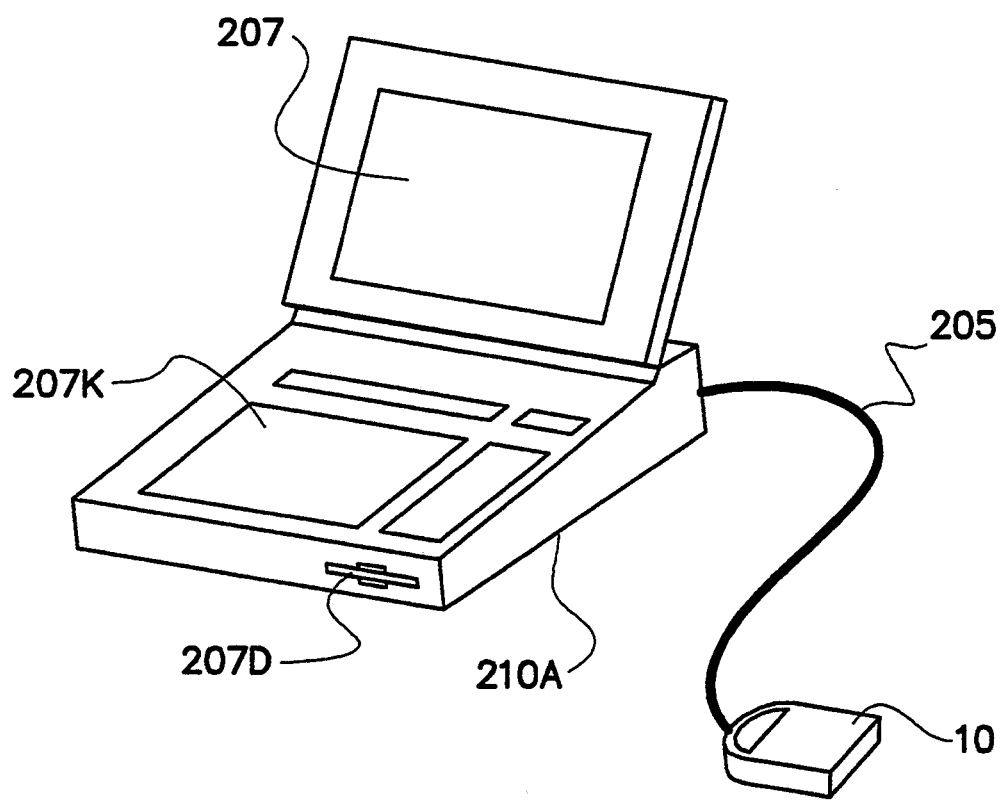
FIG. 14 shows a schematic diagram of a test apparatus of the invention.

Now referring to FIG. 14 which shows an alternate embodiment of the invention using an external system 210A which communicates with the laser gyro 10 of the invention as described herein. The system level control of the laser gyro 10 in this configuration is accomplished using interactive commands from the control system 210A. The control system 210A may advantageously comprise a microprocessor-based computer such as a personal computer, for example. The system 210A displays information to a human operator through visual screen 207. The operating parameters of the laser gyro system 10 are displayed on screen 207. The user uses the keyboard 207K of the control computer 210A. Those skilled in the art will recognize that gyro 10 operating parameters can be stored on removable media floppy disk 207D. The operation of the gyro 10 can be automated through a number of user interfaces including a window based system or other interactive systems. Those skilled in the art will also realize that batch-oriented testing commands can be loaded in the external system 210A and used to periodically monitor the performance of the laser gyro system 10 over long time periods.

Figure 11:
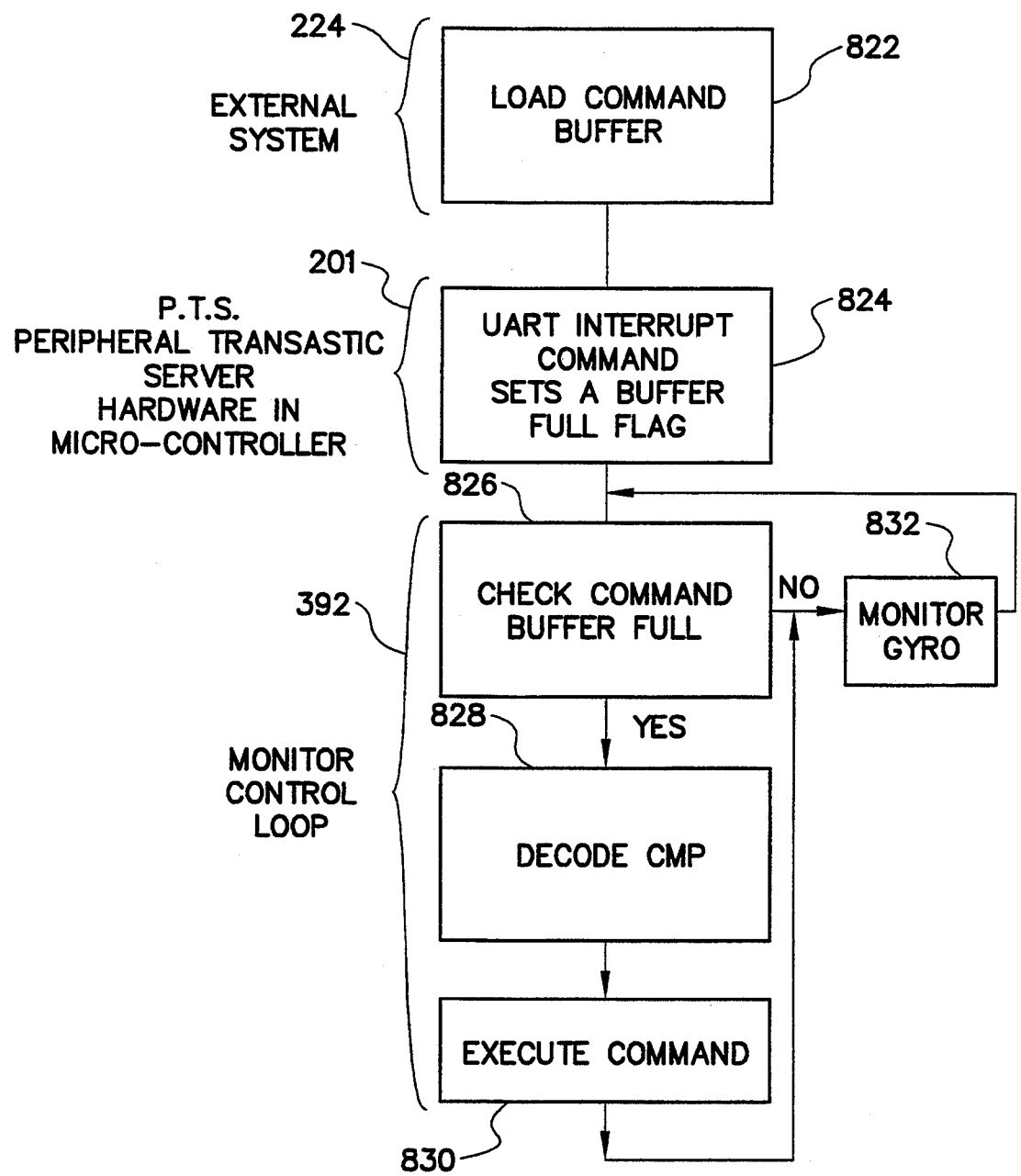
FIG. 11 shows a method of communicating between an external system and a laser gyro as employed by one embodiment of the invention.

Now referring to FIG. 11 which shows one method of the invention used to communicate between an external processing system 210 and the system microcontroller 100 for the laser gyro 10. The external processing system 210 could alternately include an inertial navigation system or a laser gyro test system. The external processing system 210 is responsible for loading a command into the output frame command buffer 230 at step 822. The command structure is shown more completely with reference to FIG. 9. The command is communicated over the receive line 204. The peripheral transaction system server 205 which is part of the microprocessor 120 sets a "command buffer full" flag. The UART 202 generates an interrupt which sets the command buffer full flag in step 824. The process of FIG. 11 then flows to enter a monitor control loop 392 and at step 826 checks whether or not the command buffer is full. If the command buffer is not full the process flows to step 832 to continue execution of the monitor control loop. If the command buffer 230 is full the process flows to decoding the command in step 828 and the process executes the command decoded in step 828 and step 830. The process then flows to step 832 to monitor the gyro. The process then flows to check the "command buffer full" flag in step 826 and repeats.

The laser gyro communicates with the external processing system 210 for many functions including reporting self test activities. The laser gyro includes a built in test equipment status register or BITE register 334 that reports the status of built in test functions, self test functions, that are executed periodically. These periodic built in test functions are called cyclic BIT functions.

Now referring to FIG. 12 which shows the built in test equipment status register 334. Each bit of BITE register 334 holds a particular meaning. Bit 0 of the BITE register 334 indicates the health of the dither drive. Bit 1 of the BITE register 334 indicates the health of the read out counter. Bit 2 of the BITE register 334 indicates the health of the laser drive current for the leg 1 of the laser gyro. Bit 3 of the BITE register 334 indicates the health of the laser drive current leg 2. Bit 4 of the BITE register 334 indicates the health of the temperature sensor while testing for a high temperature limit. Bit 5 of the BITE register 334 indicates the health of the temperature sensor while testing for a low temperature limit. Bit 6 of the BITE register 334 indicates the existence of a sample strobe to the laser gyro 10. Those skilled in the art will recognize that other features of the laser gyro 10 can be tested and their health reported in the BITE register 334 as indicated by ellipsis dots 337 in the BITE register 334.

Figure 13:
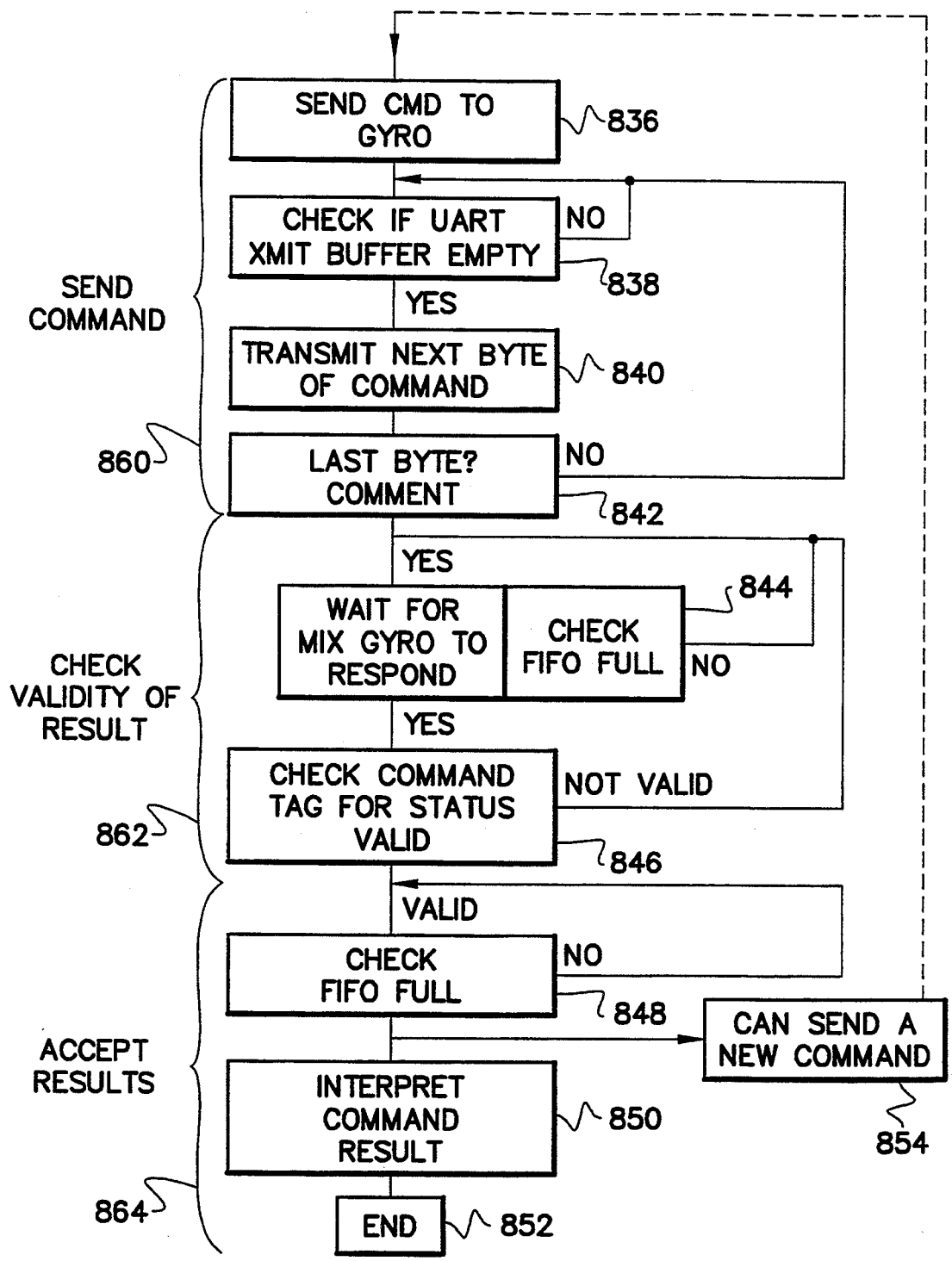
FIG. 13 shows one method of communicating high speed data in a laser gyro high speed test interface.

Now referring to FIG. 13 which shows the method of the invention used to interface the external system microprocessor 225 to the laser gyro 10 for high speed testing. The high speed test interface method of FIG. 13 starts by sending a command to the laser gyro in step 836. The process of FIG. 13 occurs in three phases. The first phase is the send gyro command phase 860. The second phase is to check the validity of the result phase 862. The third phase is the accept results phase 864. The process flows from step 836 to step 838 where a check is made to see whether or not the UART serial converter transmit buffer 209 is empty. If the UART serial converter transmit buffer 209 is not empty the process repeats until the serial converter transmit buffer 209 is empty and flows to step 840. In step 840 the process sends the next BITE of the command. The process then flows to step 842 to ,check if this is the last BITE of the command. If it is not the last BITE of the command the process flows back to step 838 to send another BITE. If it is the last BITE of the command the process flows to step 844 to wait for the modular gyro to respond. This involves checking whether or not the FIFO 217 set up in FIG. 8 is full. If the FIFO 217 is not full the process returns to step 844 to wait for the modular gyro to fully respond. If the FIFO 217 is full the process checks the command tag for a valid status. If the status is not valid the process flows to 844 to wait for the modular gyro to respond again. If the command tag 244 status is valid the process flows to step 848 to check for the FIFO full if the FIFO 217 is not full the process returns to 848 to wait for it to fill. The process then flows to 850 where the command is interpreted. At this point the laser gyro has the ability to again accept a new command as shown in 854. The process in that case returns back to 836 where the external system microprocessor 225 will send another command to the gyro. After the command is interpreted the process ends at 852.

Calculation of Volts Per Mode

Figure 15:
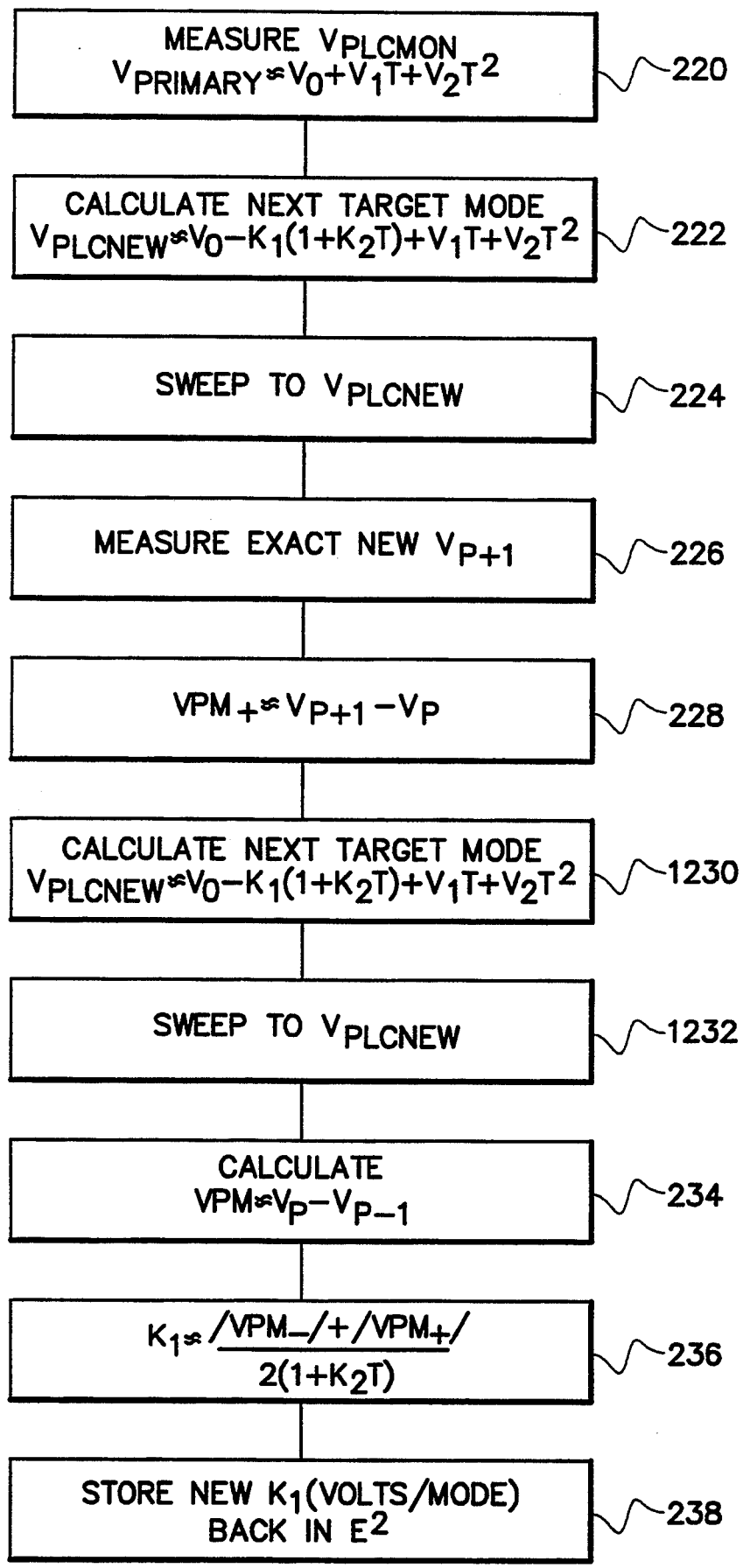
FIG. 15 shows a flow diagram of one method of the invention used to calculate volts per mode.

Now referring to FIG. 15 which shows a flow diagram of the method of the invention used to calculate the volts per mode of the laser gyro which is a derived lifetime estimation parameter. The methods of acquiring a mode and sweeping the laser gyro path length controllers, two important functions for calculating volts per mode are described hereinbelow.

Figure 16:
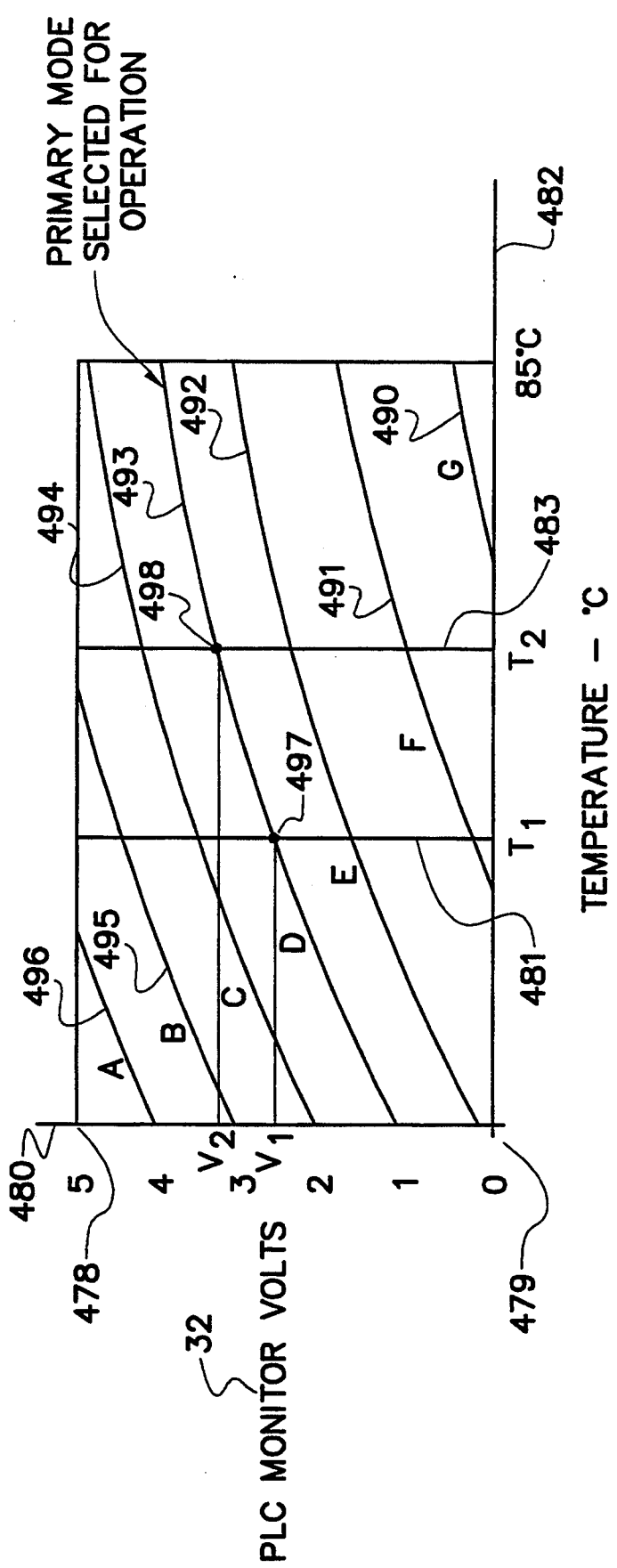
FIG. 16 shows seven modes of one example embodiment of a laser gyro.

Operating modes of the laser gyro 200 are dependent on temperature. Temperature fluctuations in gyro modes are illustrated in FIG. 16. FIG. 16 shows the behavior of path length control monitor voltage PLCMON 32 as it depends on temperature. A local peak, or maximum, in LIM is defined as a mode and is plotted as a parameter in terms of PLC monitor volts and as a function of temperature. Temperature is shown on the horizontal axis 482 which indicates increasing temperature to the right. PLC monitor voltage 32 is shown on the vertical axis 480 which indicates increasing PLC monitor output voltage toward the top of the graph.

FIG. 16 shows seven modes of one example embodiment of the laser gyro 10 of the invention as modes G through A numbered 490 through 496 respectively. FIG. 16 also shows two operating points of the laser gyro 497 and 498. It can be seen from FIG. 16 that as the temperature of the laser gyro changes so does the operating point of each mode. Lines 481 and 483 are provided to illustrate the effect of an increase in temperature from T1 to T2. Lines 481 and 483 intersect a number of mode curves providing several operating modes for the laser gyro at T1 and T2 respectively. Points 497 and 498 illustrate the effect a change in temperature has on the mode voltage. The laser gyro 10 is assumed to be operating on mode D, alternately known as the primary mode, at operating point 498.

While operating at T1 the path length control monitor voltage PLCMON 32 is shown in FIG. 16 to be V1 on axis 480. As the laser gyro changes temperature from T1 to T2 the PLCMON 32 voltage changes from V1 to V2 changing the operating point of the gyro to operating point 498 corresponding to PCLMON 32 voltage of V2. As the PLCMON 32 voltage swings through its minimum voltage 479 to its maximum voltage 478 the available modes at any given temperature changes such that not all modes are available at every temperature. Therefore a need may arise, as the temperature changes, to hop a mode.

Now referring again to FIG. 6 which shows the apparatus of the invention to acquire a lasing mode and to hop lasing modes. The apparatus of the invention controls the path length transducers for mirror A and mirror B of the laser block 200. The laser block has a number of sensors including a temperature sensor 33 which sends a temperature signal which is amplified by temperature sensor amplifier 58 which provides a temperature signal 31 to the on board A/D converter 111. The temperature signal 31 is used by the microprocessor to perform mode acquisition and mode hopping functions which follow the curves of FIG. 16.

The laser block 200 also has a power detect signal 57 which is picked up from photo diode 56 connected to DC amplifier 68 which provides the laser intensity monitor (LIM) signal 20. The gyro block 200 transducer mirrors A and B provide the principle means by which path length control is achieved. As the laser path is adjusted with the path length control transducers the laser intensity monitor signal 20 will vary. The invention provides a number of components that help process the laser intensity monitor signal into a useful set of signals including the laser intensity monitor signal 20, a path length control monitor signal 32 and a single beam signal 36.

The AC amplifier 50 receives the AC component of the laser intensity monitor 20. The output of the AC amplifier 50 is sent to a synchronous demodulator 52 which provides a signal to an integrator 54 which generates the path length control monitor signal PLCMON 32. The output of the AC amplifier 50 is also AC coupled to a peak detector 66 which provides a single beam signal 36. The AC amplifier 50 also has as an input from the sweep signal 113 which is synchronized to the switch signal 124. The synchronous demodulator 52 also provides a method by which the closed loop path from the laser intensity monitor through to the path length control monitor can be used to adjust the path length.

Now referring again to FIG. 15, the process of calculating volts per mode starts by first measuring the path length control monitor voltage at step 220 $V_{primary}$ (Also designated $V_p$)=$V_0+V_1T+V_2T^2$. The process then flows to 222 where the target mode is calculated as $V_{PLCNEW}=V_0-K_1(1+K_2T)+V_1T+V_2T^2$. The process then steps to step 224 where the laser gyro is swept to the $V_{PLCNEW}$ voltage. The process steps to 226 where the voltages referred to in this method are defined as follows. $V_P$ is the voltage of the path length controller at the primary mode. $V_{P+1}$ is the voltage of the path length control monitor at one mode higher than the primary mode. $V_{P-1}$ is the voltage of the path length control monitor at one mode lower than the primary mode. Process step 222 calculates the next higher target mode voltage as $V_{P+1}$. In step 226 the exact $V_{P+1}$ voltage is measured. In this volts per mode calculation a volts per mode for the laser gyro will be calculated for the positive direction and the negative direction. The positive volts per mode is called VPM+ and the negative volts per mode is called VPM. The process then flows to step 228 where the voltage per mode in the positive direction is calculated as the voltage of the next higher mode to the primary mode $V_{P+1}$ minus the voltage of the primary mode $V_P$. The process then flows to 1230 where the $V_{PLCNEW}$ voltage for the new voltage in the negative direction is calculated as $V_0-K_1(1+K_2T)+V_1T+V_2T^2$. The process of FIG. 2 then flows to process step 1232 where the PLC transducers are swept to $V_{PLCNEW}$ following the method discussed hereinbelow.

The process then flows to process step 234 where the new volts per mode in the negative direction is calculated as the difference between the primary volts of the path length control monitor minus the new negative $V_{P-1}$. In process step 236 the new $K_1$ constant is computed as the absolute value of the negative volts per mode plus the absolute value of the positive volts per mode divided by two times the quantity $(1+K_2T)$. The process then flows to step 238 where the new $K_1$ (volts/mode) is stored in the $E^2PROM$ 102.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A laser gyro start up apparatus comprising:
   (a) a laser gyro;
   (b) a laser gyro start up means connected to the laser gyro to start up the laser gyro in a predetermined manner; and
   (c) a laser gyro monitoring means connected to the laser start up means to monitor the laser gyro and evaluate and report the health status of the laser gyro.

2. The laser gyro start up apparatus of claim 1 wherein the laser gyro start up means further comprises a microprocessor.

3. The laser gyro start up apparatus of claim 1 further comprising a command and control means connected to the laser gyro start up means to send and receive startup commands from the laser gyro start up means.

4. The laser gyro start up apparatus of claim 3 wherein the command and control means further comprises a portable computer.

5. The laser gyro start up apparatus of claim 3 wherein the laser gyro has a health status and the laser gyro startup apparatus further comprises a means for evaluating and reporting the health status.

6. The laser gyro start up apparatus of claim 5 wherein the laser gyro start up means send the health status to the command and control means.

7. The laser gyro start up apparatus of claim 6 wherein the command and control means further comprises a portable computer.

8. The laser gyro start up apparatus of claim 1 further including a nonvolatile memory means for storing laser gyro start up parameters.

9. A laser gyro start up apparatus including a microcontroller comprising:
   (a) a laser gyro;
   (b) a control means connected to control the laser gyro;
   (c) an active current control means connected to the laser gyro and control means;
   (d) a dither pickoff means connected to the laser gyro and control means;
   (e) a dither drive means connected to the laser gyro and control means;
   (f) a path length control means connected to the laser gyro and control means; and
   (g) wherein the control means starts up the active current control means, dither pickoff means, dither drive means and path length control means in a proper sequence.

10. The apparatus of claim 9 wherein the control means further comprises a microprocessor.

11. The apparatus of claim 9 wherein the control means further comprises a microcontroller.

12. The apparatus of claim 11 wherein the microcontroller further comprises:
   (a) an A/D converter connected to the microcontroller;
   (b) a nonvolatile memory means for storing operating parameters of the laser gyro connected to the microcontroller; and
   (c) high speed input and output logic connected to send and receive information from the A/D converter.

13. The laser gyro start up apparatus of claim 9 wherein the laser gyro has a health status and the laser gyro startup apparatus further comprises a means for evaluating and reporting the health status.

14. The laser gyro start up apparatus of claim 13 further comprising a command and control means connected to the laser gyro start up means to send and receive startup commands from the laser gyro start up means.

15. The laser gyro start up apparatus of claim 14 wherein the command and control means further comprises a portable computer.

16. The laser gyro start up apparatus of claim 14 wherein the laser gyro has a health status and the laser gyro startup apparatus further comprises a means for evaluating and reporting the health status.

17. The laser gyro start up apparatus of claim 16 wherein the laser gyro start up means send the health status to the command and control means.

18. The laser gyro start up apparatus of claim 6 wherein the command and control means further comprises a portable computer.

19. A laser gyro start up apparatus comprising:
   (a) a microcontroller means with a microprocessor means and a gate array registers;
   (b) an A/D converter means connected to the microcontroller means wherein the A/D converter further comprises a nonvolatile memory means and digital control logic and high speed input and output logic;
   (c) an active current control means for controlling a laser current wherein the active current control means is connected to the microprocessor means having an active current control register on an IO Port 1;
   (d) a dither pickoff means connected to the microprocessor means;
   (e) a dither drive means connected to the microprocessor means;
   (f) a path length control means connected to the microprocessor means;
   (g) a pulse width modulator means connected to the path length control means;
   (h) a content addressable memory means connected to the microcontroller means;
   (i) a real time clock means connected to the microprocessor means;
   (j) a UART IO system controller means connected to the microprocessor;
   (k) a peripheral transaction server means connected to the microprocessor;
   (l) a random generator means; and
   (m) wherein the microprocessor starts up the active current control means, dither pickoff means, dither drive means and path length control means in a predetermined sequence.

20. The laser gyro start up apparatus of claim 19 wherein the laser gyro startup apparatus includes a laser gyro further including a laser gyro health status, a priority queue, a conversion complete queue, a function controller, a control status built in test equipment means, a timer, a high speed input, an external real time clock, a software timer, a time capture interrupt means, and a UART, the predetermined sequence comprising at least one of the steps of:
   (a) clearing the gate array registers;
   (b) initializing the active current control register on the IO Port 1;
   (c) clearing the content addressable memory means;
   (d) initializing a high speed input logic means;
   (e) initializing the nonvolatile memory means;
   (f) setting the pulse width modulator means to 50% duty cycle;
   (g) setting the active current control means;
   (h) energizing the laser gyro;
   (i) initializing the dither drive random number generator means;
   (j) initializing the real time clock means;
   (k) initializing the dither pickoff means;
   (l) initializing the dither drive means;
   (m) initializing the UART IO system controller means;
   (n) initializing the laser gyro health status to unhealthy;
   (o) setting the path length control means to maximum sweep;
   (p) initializing the peripheral transaction server means;
   (q) reading the nonvolatile memory means to a scratch pad RAM means in the microprocessor;
   (r) initializing the priority queue means;
   (s) initializing the conversion complete queue means;
   (t) initializing the function control word means;
   (u) initializing the control status built in test equipment means;
   (v) synchronizing the timer 1 means and the timer 2 means;
   (w) flushing the high speed input means;
   (x) setting up interrupts for the external real time clock, the peripheral transaction server, the high speed input and high speed output and the software timer;
   (y) waiting 200 milliseconds for the dither drive means to initialize;
   (z) reading a reference voltage with the A/D converter means;
   (aa) starting the dither drive means;
   (ab) enabling a time capture interrupt means;
   (ac) flushing the UART means;
   (ad) checking the path length control means to see if they are functioning;
   (ae) checking to see if the laser current is within limits;
   (af) starting the path length control means locking sequence; and
   (ag) enabling the peripheral transaction server means.

21. The method of claim 20 wherein the microcontroller further executes a built in test function.

22. The method of claim 20 wherein the microcontroller further reports a health status to a system controller.

* * * * *